US012745710B2

(12) United States Patent
Liu et al.

(10) Patent No.: US 12,745,710 B2
(45) **Date of Patent: *Sep. 29, 2026**

(54) ELECTRIC RIDING LAWN MOWER

(71) Applicant: Nanjing Chervon Industry Co., Ltd., Nanjing (CN)

(72) Inventors: Qian Liu, Nanjing (CN); Toshinari Yamaoka, Nanjing (CN); Zhen Wang, Nanjing (CN); Fangjie Nie, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 509 days.

This patent is subject to a terminal disclaimer.

(21) Appl. No.: 18/451,930

(22) Filed: Aug. 18, 2023

(65) Prior Publication Data

US 2023/0389476 A1 Dec. 7, 2023

Related U.S. Application Data

(63) Continuation-in-part of application No. 18/191,776, filed on Mar. 28, 2023, now Pat. No. 11,839,178, (Continued)

(30) Foreign Application Priority Data

Dec. 28, 2017 (CN) ......................... 201711457168.5
Aug. 6, 2018 (CN) ......................... 201810885961.3

(51) Int. Cl.
*A01D 69/02* (2006.01)
*A01D 34/64* (2006.01)
(Continued)

(52) U.S. Cl.
CPC ............. *A01D 69/02* (2013.01); *A01D 34/64* (2013.01); *A01D 34/78* (2013.01); *A01D 2101/00* (2013.01)

(58) Field of Classification Search
CPC ........ A01D 69/02; A01D 34/64; A01D 34/78; A01D 2101/00
(Continued)

(56) References Cited

U.S. PATENT DOCUMENTS 3,732,671 A 5/1973 Allen
3,823,367 A 7/1974 Kaye
(Continued)

FOREIGN PATENT DOCUMENTS

CN 102388720 A 3/2012
CN 103125212 A 6/2013
(Continued)

OTHER PUBLICATIONS

Information About the Result of Oral Proceedings held on Oct. 16, 2024 of EP application No. 18894932.5, dated Nov. 14, 2024, 19 pp.
(Continued)

*Primary Examiner* — Hau V Phan
(74) *Attorney, Agent, or Firm* — Greenberg Traurig, LLP

(57) ABSTRACT

An electric riding lawn mower includes a seat for a user to ride, a main frame to support the seat, a power output assembly including a mowing element to output power to realize mowing function and a first motor to drive the mowing element, a walking assembly to at least drive the electric riding lawn mower to travel in the direction of a first straight line on the ground and a second motor to drive the walking assembly, and a power supply device to power the electric riding lawn mower with a first battery pack, which includes a first battery pack housing and a plurality of battery cells disposed therein. The power supply device is mounted to the main frame. At least one of the first battery packs of the power supply device forms a pluggable connection with the main frame. The battery cells are lithium batteries.

20 Claims, 16 Drawing Sheets

Related U.S. Application Data which is a continuation of application No. 17/825,298, filed on May 26, 2022, now Pat. No. 11,653,598, which is a continuation of application No. 16/909,549, filed on Jun. 23, 2020, now Pat. No. 11,696,531, which is a continuation of application No. PCT/CN2018/123856, filed on Dec. 26, 2018.

(51) Int. Cl.
*A01D 34/78* (2006.01)
*A01D 101/00* (2006.01)

(58) Field of Classification Search
USPC .......................................................... 56/11.9
See application file for complete search history.

(56) References Cited

U.S. PATENT DOCUMENTS

| | | | |
|---|---|---|---|
| 3,850,259 | A | 11/1974 | Ikeda |
| 4,876,846 | A | 10/1989 | Torras |
| 5,540,037 | A | 7/1996 | Lamb |
| 5,727,372 | A | 3/1998 | Kanitz |
| 5,794,422 | A | 8/1998 | Reimers |
| 5,809,756 | A | 9/1998 | Scag |
| 5,934,053 | A | 8/1999 | Fillman |
| 5,946,894 | A | 9/1999 | Eavenson |
| 6,082,082 | A | 7/2000 | Hunter |
| 6,082,084 | A | 7/2000 | Reimers |
| 6,490,849 | B1 | 12/2002 | Scag |
| 6,571,542 | B1 | 6/2003 | Fillman |
| 6,591,593 | B1 | 7/2003 | Brandon |
| 6,688,089 | B2 | 2/2004 | Velke |
| 6,826,895 | B2 | 12/2004 | Iida |
| 6,856,895 | B2 | 2/2005 | Hashida |
| 7,392,869 | B2 | 7/2008 | Carlson |
| 7,578,116 | B1 | 8/2009 | Howell |
| 7,594,377 | B1 | 9/2009 | Jansen |
| 7,596,636 | B2 | 9/2009 | Gormley |
| 7,610,975 | B1 | 11/2009 | Gust |
| 7,610,986 | B2 | 11/2009 | Ohashi |
| 7,661,486 | B2 | 2/2010 | Turner |
| 7,673,712 | B2 | 3/2010 | Iida |
| 7,686,108 | B2 | 3/2010 | Piontek |
| 7,712,294 | B2 | 5/2010 | Wright |
| 7,721,517 | B2 | 5/2010 | Hunt |
| 7,731,398 | B2 | 6/2010 | Probasco |
| 7,735,592 | B2 | 6/2010 | Bellot |
| 8,191,342 | B2 | 6/2012 | Ishii |
| 8,397,367 | B2 | 3/2013 | Melone |
| 8,429,885 | B2 | 4/2013 | Rosa |
| 8,572,939 | B2 | 11/2013 | Koike |
| 8,653,786 | B2 | 2/2014 | Baetica |
| 8,794,660 | B1 | 8/2014 | Stover |
| 9,010,077 | B2 | 4/2015 | Elder |
| 9,210,839 | B2 | 12/2015 | Schygge |
| 9,226,444 | B2 | 1/2016 | Schygge |
| 9,282,695 | B2 | 3/2016 | Goto |
| 9,296,306 | B2 | 3/2016 | Schygge |
| 9,357,695 | B2 | 6/2016 | Higashikawa |
| 9,535,695 | B2 | 1/2017 | Mylius |
| 9,616,736 | B2 | 4/2017 | Ito |
| 9,686,909 | B2 | 6/2017 | Schygge |
| 9,699,965 | B2 | 7/2017 | Schygge |
| 9,705,332 | B2 | 7/2017 | Oudalov |
| 9,711,767 | B2 | 7/2017 | Juenger |
| 9,867,331 | B1 | 1/2018 | Siudyla |
| 9,949,436 | B2 | 4/2018 | Ito |
| 10,029,551 | B2 | 7/2018 | Ito |
| 10,093,169 | B1 | 10/2018 | Keller |
| 10,098,278 | B2 | 10/2018 | Velderman |
| 10,868,435 | B2 | 12/2020 | Hoppel |
| 10,980,173 | B2 | 4/2021 | Becke |
| 11,081,893 | B2 | 8/2021 | Chow |
| 11,653,598 | B2 | 5/2023 | Liu |
| 11,696,531 | B2 | 7/2023 | Liu |
| 11,839,177 | B2 | 12/2023 | Liu |
| 11,839,178 | B2 | 12/2023 | Liu |
| 11,910,752 | B2 | 2/2024 | Liu |
| 11,917,945 | B2 | 3/2024 | Yang |
| 2003/0029149 | A1 | 2/2003 | Fillman |
| 2004/0050026 | A1 | 3/2004 | Stover |
| 2006/0058897 | A1 | 3/2006 | Senda |
| 2006/0059879 | A1 | 3/2006 | Edmond |
| 2006/0059880 | A1 | 3/2006 | Angott |
| 2006/0091858 | A1 | 5/2006 | Johnson |
| 2007/0125054 | A1 | 6/2007 | Dong |
| 2007/0125056 | A1 | 6/2007 | Edmond |
| 2008/0034722 | A1 | 2/2008 | Wright |
| 2008/0264026 | A1 | 10/2008 | Ishii |
| 2009/0260901 | A1 | 10/2009 | Ishii |
| 2011/0289896 | A1 | 12/2011 | Sasahara |
| 2012/0186887 | A1 | 7/2012 | Moriguchi |
| 2012/0235642 | A1 | 9/2012 | Mao |
| 2012/0238403 | A1 | 9/2012 | Koike |
| 2013/0014966 | A1 | 1/2013 | Tozawa |
| 2013/0097984 | A1 | 4/2013 | Elder |
| 2013/0239533 | A1 | 9/2013 | Juenger |
| 2014/0015451 | A1 | 1/2014 | Funabashi |
| 2014/0137528 | A1 | 5/2014 | Schygge |
| 2014/0144117 | A1 | 5/2014 | Schygge |
| 2014/0144177 | A1 | 5/2014 | Stallman |
| 2014/0165524 | A1 | 6/2014 | Schygge |
| 2014/0244090 | A1 | 8/2014 | Schygge |
| 2014/0259804 | A1 | 9/2014 | Eavenson, Sr. |
| 2015/0240773 | A1 | 8/2015 | Koenen |
| 2015/0359174 | A1 | 12/2015 | Ito |
| 2015/0366130 | A1 | 12/2015 | Bergström |
| 2016/0014954 | A1 | 1/2016 | Dwyer |
| 2016/0183451 | A1 | 6/2016 | Conrad |
| 2016/0198630 | A1 | 7/2016 | Skoog |
| 2016/0242356 | A1 | 8/2016 | Velderman |
| 2016/0288829 | A1 | 10/2016 | Ito |
| 2016/0338266 | A1 | 11/2016 | Yamaoka |
| 2017/0013780 | A1 | 1/2017 | Ito |
| 2017/0055443 | A1 | 3/2017 | Fujii |
| 2017/0136864 | A1 | 5/2017 | Ito |
| 2017/0196164 | A1 | 7/2017 | Bryant |
| 2017/0263914 | A1 | 9/2017 | Ito |
| 2017/0265381 | A1 | 9/2017 | Kuriyagawa |
| 2017/0335818 | A1 | 11/2017 | Dwyer |
| 2017/0366817 | A1 | 12/2017 | Hashimoto |
| 2019/0075724 | A1 | 3/2019 | Becke |
| 2019/0160972 | A1 | 5/2019 | Zeiler |
| 2020/0170184 | A1 | 6/2020 | Velderman |
| 2020/0267903 | A1 | 8/2020 | Gao |
| 2020/0315095 | A1 | 10/2020 | Liu |
| 2022/0369550 | A1 | 11/2022 | Steinert |
| 2022/0408648 | A1 | 12/2022 | Yang |
| 2022/0408649 | A1 | 12/2022 | Yang |
| 2022/0410762 | A1 | 12/2022 | Yang |
| 2023/0202314 | A1 | 6/2023 | Yang |

FOREIGN PATENT DOCUMENTS

| | | | |
|---|---|---|---|
| CN | 102422750 | B | 7/2013 |
| CN | 203423971 | U | 2/2014 |
| CN | 103970039 | A | 8/2014 |
| CN | 103053265 | B | 10/2014 |
| CN | 103518487 | B | 9/2015 |
| CN | 105850340 | A | 8/2016 |
| CN | 106471990 | A | 3/2017 |
| CN | 206260323 | U | 6/2017 |
| CN | 107205337 | A | 9/2017 |
| CN | 103813918 | B | 4/2018 |
| CN | 109557910 | A | 4/2019 |
| CN | 209710730 | U | 12/2019 |
| DE | 212015000289 | U1 | 7/2017 |
| EP | 0262285 | B1 | 8/1991 |
| EP | 2110295 | B1 | 2/2012 |
| EP | 2543244 | A1 | 1/2013 |
| EP | 2724604 | A1 | 4/2014 |
| EP | 2534938 | B1 | 10/2015 |
| EP | 2793346 | B1 | 6/2016 |

(56) References Cited

FOREIGN PATENT DOCUMENTS

| | | | |
|---|---|---|---|
| EP | 3079182 | B1 | 9/2018 |
| EP | 3219188 | B2 | 7/2022 |
| FR | 2252802 | B1 | 10/1976 |
| WO | 9520868 | W | 8/1995 |
| WO | 2013009325 | A1 | 1/2013 |
| WO | 2013102023 | A1 | 7/2013 |
| WO | 2016074239 | A1 | 5/2016 |
| WO | 2016094475 | A2 | 6/2016 |
| WO | 2016109860 | A2 | 7/2016 |
| WO | 2017013602 | A1 | 1/2017 |
| WO | 2017145093 | A1 | 8/2017 |
| WO | 2017173944 | A1 | 10/2017 |
| WO | 2017173945 | A1 | 10/2017 |
| WO | 2018031719 | A1 | 2/2018 |
| WO | 2018102338 | A1 | 6/2018 |
| WO | 2020147841 | A1 | 7/2020 |
| WO | 2024064793 | A1 | 3/2024 |

OTHER PUBLICATIONS

Non-final Office Action from U.S. Appl. No. 17/835,527, dated May 5, 2025, 7 pp.

Non-final Office Action from U.S. Appl. No. 18/170,817, dated Jun. 16, 2023, 13 pp.

CIPO, office action issued on Canadian patent application No. 3,087,293, dated Sep. 26, 2022, 3 pages.

International Search Report and Written Opinion of international application No. PCT/CN2022/098357, dated Sep. 21, 2022, 16 pp.

EPO, extended European Search Report issued on European patent application No. 18894932.5, dated Dec. 8, 2020, 3 pages.

Extended European Search Report issued on European patent application No. 19843130.6, dated Aug. 24, 2021, 8 pages.

EPO, partial European search report issued on European patent application No. 22178263.4, dated Nov. 25, 2022, 11 pages.

International Search Report and Written Opinion of international application No. CN2018/123856, dated Mar. 22, 2018, 13 pp.

Office Action from Canadian application number 3,165,100, dated Sep. 21, 2023, 10 pp.

Office Action from EP application No. 22151071.2, dated Sep. 13, 2023, 7 pp.

Office Action from Canadian application No. 3,193,671, dated Jun. 28, 2024, 7 pp.

Non-final office action from U.S. Appl. No. 18/409,050, dated Dec. 13, 2024, 10 pp.

Office Action from Canadian application No. 3,165,100, dated Apr. 18, 2024, 9 pp.

Extended Search Report from European application No. 25169914.6, dated Sep. 23, 2025, 4 pp.

ELECTRIC RIDING LAWN MOWER

RELATED APPLICATION INFORMATION

This application is a continuation-in-part of U.S. application Ser. No. 18/191,776, filed on Mar. 28, 2023, which application is a continuation of U.S. application Ser. No. 17/825,298, filed on May 26, 2022, which application is a continuation of U.S. application Ser. No. 16/909,549, filed on Jun. 23, 202, which application is a continuation of International Application Number PCT/CN2018/123856, filed on Dec. 26, 2018, through which this application also claims the benefit under 35 U.S.C. § 119(a) of Chinese Patent Application No. CN 201711457168.5, filed on Dec. 28, 2017, and Chinese Patent Application No. CN 201810885961.3, filed on Aug. 6, 2018, each of which is incorporated by reference in its entirety herein.

TECHNICAL FIELD

The present disclosure relates to an electric riding machine, in particular to an electric riding lawn mower.

BACKGROUND

As a garden tool, lawn mowers are widely used in the field of trimming lawn and vegetation, etc. Existing lawn mowers generally include handheld lawn mowers and riding lawn mowers. Among them, handheld lawn mowers are widely used because of its advantages such as small size and convenient portability. However, mowing capacity, mowing efficiency, and battery life of handheld lawn mowers cannot meet the needs of large lawn areas. Therefore, a kind of electric riding lawn mowers has gradually emerged on the market. However, the riding lawn mowers currently on the market are generally powered by gasoline or diesel, which not only pollutes the environment and goes against environmental protection, but also incurs increased maintenance costs because the wearing parts in the fuel system needs to be replaced frequently.

SUMMARY

In one example, an electric riding lawn mower includes a seat for a user to ride; a main frame configured to support the seat; a power output assembly including a mowing element for outputting power to realize a mowing function and a first motor for driving the mowing element to output power; a walking assembly configured to at least drive the electric riding lawn mower to travel in a first straight line on the ground and including a second motor to drive the walking assembly; and a power supply device including one or more first battery packs to power the electric riding lawn mower; wherein each of the one or more first battery packs including: a first battery pack housing; and battery cells disposed in the first battery pack housing; wherein the power supply device is mounted to the main frame, and at least one of the one or more first battery packs of the power supply device forms a pluggable connection with the main frame, and the battery cells are lithium batteries.

In one example, the one or more first battery packs detachably coupled to the main frame are also configured to power another power tool.

In one example, a discharge power of all of the one or more first battery packs included in the power supply device is greater than or equal to 2000 W and less than or equal to 4000 W.

In one example, a ratio of the discharge power of a single one of the one or more first battery packs to the nominal voltage of a single one of the one or more first battery packs is greater than or equal to 10 W/V and less than or equal to 25 W/V.

In one example, the capacity of a single one of the one or more first battery packs is greater than or equal to 130 Wh and less than or equal to 1000 Wh, and a number of the one or more first battery packs included in the power supply device is greater than or equal to 4 and less than or equal to 10.

In one example, the weight of a single one of the one or more first battery packs is greater than or equal to 0.1 kg and less than or equal to 4 kg, and a number of the one or more first battery packs included in the power supply device is greater than or equal to 4 and less than or equal to 10.

In one example, the discharge power of a single one of the one or more first battery packs is greater than or equal to 500 W and less than or equal to 6500 W, and a number of the one or more first battery packs included in the power supply device is greater than or equal to 4 and less than or equal to 10.

In one example, the walking assembly includes: a first travelling wheel having a first diameter; and a second travelling wheel having a second diameter greater than the first diameter; wherein the power supply device includes: at least one first battery compartment disposed on the rear side of the seat; wherein a number of the at least one first battery compartments is one or more; and wherein in a direction of the first straight line, a distance between a center of a whole constituted by all of the at least one first battery compartments disposed on the rear side of the seat along the direction of the first straight line and a rotating shaft of the second travelling wheel is less than or equal to 300 mm.

In one example, the walking assembly includes: a first travelling wheel having a first diameter; and a second travelling wheel having a second diameter greater than the first diameter; wherein the power supply device includes: at least one first battery compartment disposed on the rear side of the seat; wherein a number of the at least one first battery compartments is two; and wherein in a direction of the first straight line, a distance between a center of a whole constituted by all of the at least one first battery compartments disposed on the rear side of the seat along the direction of the first straight line and a rotating shaft of the second travelling wheel is less than or equal to 300 mm.

In one example, the walking assembly includes: a first travelling wheel having a first diameter; and a second travelling wheel having a second diameter greater than the first diameter; wherein the power supply device includes: at least one first battery compartment disposed on the rear side of the seat; wherein a number of the first battery compartments is one or more; and wherein in a horizontal direction perpendicular to the rotation axis of the second travelling wheel, a distance between a center of a whole constituted by all of the at least one first battery compartments disposed on the rear side of the seat along the horizontal direction and a rotating shaft of the second travelling wheel is less than or equal to 300 mm.

In one example, the walking assembly includes: a first travelling wheel rotatable about a first axis; and a second travelling wheel rotatable about a second axis; wherein the first travelling wheel having a first diameter, and the second travelling wheel having a second diameter greater than the first diameter; wherein the power supply device includes: at least one first battery compartment disposed on the rear side of the seat; wherein a number of the at least one first battery compartments is one or more; and wherein in a direction perpendicular to the first straight line and perpendicular to the second axis, a distance between a center of a whole constituted by all of the at least one first battery compartments disposed on the rear side of the seat and the second axis is less than or equal to 300 mm.

In one example, the walking assembly includes: a first travelling wheel rotatable about a first axis; and a second travelling wheel rotatable about a second axis; wherein the first travelling wheel having a first diameter, and the second travelling wheel having a second diameter greater than the first diameter; wherein the power supply device includes: at least one first battery compartment disposed on the rear side of the seat; wherein a number of the at least one first battery compartments is one or more; wherein in a direction parallel to the second axis, a distance between a center of a whole constituted by all of the at least one first battery compartments disposed on the rear side of the seat and a center of two second travelling wheels is less than or equal to 300 mm.

In one example, the walking assembly includes: a first travelling wheel having a first diameter; and a second travelling wheel having a second diameter greater than the first diameter; wherein the power supply device includes: a first battery compartment set including one or more first battery compartments, wherein the one or more first battery compartment are disposed on the rear side of the seat, and the one or more first battery compartment are used for detachably mounting the one or more first battery packs, and the one or more first battery packs are further configured to power another power tool; wherein a number of the one or more first battery compartments are one or more, and the power supply device is disposed on the rear side of the seat; and wherein in the a of the first straight line, a distance between a center of gravity of the power supply device to which the one or more first battery packs are mounted and a rotating shaft of the second travelling wheel is less than or equal to 300 mm.

In one example, the walking assembly includes: a first travelling wheel having a first diameter; and a second travelling wheel having a second diameter greater than the first diameter; wherein the power supply device includes: a first battery compartment set including one or more first battery compartments, wherein the one or more first battery compartments are disposed on the rear side of the seat, the one or more first battery compartments are used for detachably mounting the one or more first battery packs, and the one or more first battery packs are further configured to power another power tool; wherein a number of the one or more first battery compartments is one or more, and the power supply device is disposed on the rear side of the seat; and wherein in a horizontal direction perpendicular to a rotation axis of the second travelling wheel, a distance between a center of gravity of the power supply device to which the one or more first battery packs are mounted and a rotating shaft of the second travelling wheel is less than or equal to 300 mm.

In one example, the walking assembly includes: a first travelling wheel rotatable about a first axis; and a second travelling wheel rotatable about a second axis; wherein the power supply device includes: a first battery compartment set including one or more first battery compartments, wherein the one or more first battery compartments are disposed on the rear side of the seat, the one or more first battery compartment are used for detachably mounting the one or more first battery packs, and the one or more first battery packs are further configured to power another power tool; wherein a number of the one or more first battery compartments are one or more, and the power supply device is disposed on the rear side of the seat; and wherein in a direction perpendicular to the first straight line and perpendicular to the second axis, a distance between a center of gravity of a whole of the power supply device to which the one or more first battery packs are mounted and the second axis is less than or equal to 300 mm.

In one example, an electric riding lawn mower including: a seat for a user to ride; a main frame to support the seat; a power output assembly including a mowing element for outputting power to realize a mowing function and a first motor for driving the mowing element to output power; a walking assembly configured to at least drive the electric riding lawn mower to travel in a first straight line on the ground and including a second motor to drive the walking assembly; and a power supply device including at least one first battery compartment to couple to a battery pack; wherein the at least one first battery compartment is mounted to the main frame, the at least one first battery compartment is used for pluggable coupling to the battery pack, the at least one first battery compartment is further provided with input terminals to bring in electrical energy to the electric riding lawn mower.

In one example, a number of the at least one first battery compartment is greater than or equal to 4 and less than or equal to 10.

In one example, the walking assembly included: a first travelling wheel having a first diameter; and a second travelling wheel having a second diameter greater than the first diameter; wherein a number of the at least one first battery compartment is one or more; and wherein in a direction of the first straight line, a distance between the center of a whole constituted by all of the at least one the first battery compartment disposed on the rear side of the seat along the direction of the first straight line and a rotating shaft of the second travelling wheel is less than or equal to 300 mm.

In one example, the walking assembly includes: a first travelling wheel rotatable about a first axis; and a second travelling wheel rotatable about a second axis; wherein the first travelling wheel has a first diameter, and the second travelling wheel has a second diameter greater than the first diameter; wherein a number of the at least one first battery compartment is one or more; wherein in a direction perpendicular to the first straight line and perpendicular to the second axis, a distance between a center of a whole constituted by all of the at least one first battery compartment disposed on the rear side of the seat and the second axis is less than or equal to 300 mm.

In one example, the walking assembly includes: a first travelling wheel rotatable about a first axis; and a second travelling wheel rotatable about a second axis; wherein the first travelling wheel has a first diameter, and the second travelling wheel has a second diameter greater than the first diameter; wherein a number of the at least one of first battery compartment is one or more; and wherein in a direction parallel to the second axis, a distance between the center of a center of a whole constituted by all of the at least one first battery compartment disposed on the rear side of the seat and a center of two second travelling wheels is less than or equal to 300 mm.

In one example, an electric riding machine including: a seat for a user to ride; a main frame to support the seat; a power output assembly including a mowing element for outputting power to realize a mowing function and a first motor for driving the mowing element to output power; a walking assembly configured to at least drive the electric riding lawn mower to travel in a first straight line on the ground and including a second motor to drive the walking assembly; and a power supply device including at least one first battery pack to power the electric riding machine; wherein the power supply device is mounted to the main frame, at least one of the at least one first battery pack of the power supply device form a detachable connection with the main frame, and the at least one first battery pack detachably connected with the main frame is also configured to power another power tool.

In one example, the walking assembly includes: a first travelling wheel rotatable about a first axis; and a second travelling wheel rotatable about a second axis.

In one example, the first travelling wheel has a first diameter, and the second travelling wheel has a second diameter greater than the first diameter.

In one example, the first travelling wheel is a universal wheel.

In one example, the main frame extends in a direction of the first straight line.

In one example, the walking assembly includes: a first travelling wheel rotatable about a first axis; and a second travelling wheel rotatable about a second axis; wherein the first travelling wheel has a first diameter, and the second travelling wheel has a second diameter larger than the first diameter; and wherein in a direction of the first straight line, a distance between a center of gravity of the electric riding machine and the second axis is greater than or equal to 0 and less than or equal to 400 mm.

In one example, a center of gravity of the electric riding machine is located on the lower side of the seat.

In one example, the walking assembly includes: a first travelling wheel rotatable about a first axis; and a second travelling wheel rotatable about a second axis; wherein the first travelling wheel has a first diameter, and the second travelling wheel has a second diameter larger than the first diameter; and wherein in a direction of the first straight line, a ratio of a distance between the center of gravity of the electric riding machine and the first axis to a distance between the center of gravity of the electric riding machine and the second axis is greater than or equal to 2 and less than or equal to 4.

In one example, the walking assembly includes: a first travelling wheel rotatable about a first axis; and a second travelling wheel rotatable about a second axis; wherein the first travelling wheel has a first diameter, and the second travelling wheel has a second diameter larger than the first diameter; and wherein in a direction perpendicular to the first straight line and perpendicular to the second axis, a distance between a center of gravity of the electric riding machine and the second axis is greater than or equal to 0 and less than or equal to 150 mm.

In one example, the walking assembly includes: a first travelling wheel having a first diameter; and a second travelling wheel having a second diameter greater than the first diameter; wherein the power supply device includes: at least one first battery compartment disposed on the rear side of the seat away from the first travelling wheel; wherein the at least one first battery pack of the power supply device is mounted to the at least one first battery compartment, and a number of the at least one first battery compartment is one or two or more; wherein in a direction of the first straight line, a distance between a center of a whole constituted by all of the at least one first battery compartment disposed on the rear side of the seat along the direction of the first straight line and the second axis is less than or equal to 300 mm.

In one example, the walking assembly includes: a first travelling wheel rotatable about a first axis; and a second travelling wheel rotatable about a second axis; wherein the first travelling wheel has a first diameter, and the second travelling wheel has a second diameter greater than the first diameter; wherein the power supply device includes: at least one first battery compartment disposed on the rear side of the seat away from the first travelling wheel; wherein the at least one first battery pack of the power supply device is mounted to the at least one first battery compartment, and a number of the at least one first battery compartment is one or more; and wherein in a direction perpendicular to the first straight line and perpendicular to the second axis, a distance between a center of a whole constituted by all of the at least one first battery compartment disposed on the rear side of the seat and the second axis is less than or equal to 300 mm.

In one example, the walking assembly includes: a first travelling wheel rotatable about a first axis; and a second travelling wheel rotatable about a second axis; wherein a number of the second travelling wheels is two, the two second travelling wheels are symmetrically disposed on both sides of a symmetrical plane, and the user faces a forward direction of the electric riding machine when the user sits on the seat; wherein the power supply device includes: at least one first battery compartment disposed on the rear side of the seat; and wherein a number of the at least one first battery compartment is one or more, and a whole of all of the at least one first battery compartment disposed on the rear side of the seat is symmetrically disposed about the symmetrical plane.

In one example, the user faces the forward direction of the electric riding machine when the user sits on the seat; wherein the power supply device includes: at least one first battery compartment disposed on the rear side of the seat; the at least one first battery compartment is formed with a first groove, and the at least one first battery pack is detachably inserted into the first groove in the direction of a second straight line.

In one example, the direction of the second straight line in which the at least one first battery pack is inserted into the first groove intersects the direction of the first straight line obliquely.

In one example, the angle between the direction of the second straight line in which the at least one first battery pack is inserted into the first groove and the direction of the first straight line is greater than 60 degrees and less than 90 degrees.

In one example, the direction of the second straight line in which the at least one first battery pack is inserted into the first groove is perpendicular to the direction of the first straight line.

In one example, the direction of the second straight line in which the first battery pack is inserted into the first groove is parallel to the direction of the first straight line.

In one example, the at least one first battery compartment is also formed with a locking structure for locking the at least one first battery pack on the at least one first battery compartment.

In one example, a vibration damping device is further disposed between the power supply device and the main frame.

In one example, the at least one first battery pack includes a plurality of battery cells, an extending direction of the battery cells is parallel to the direction of a second straight line in which the first battery pack is inserted into the first groove.

In one example, when the at least one first battery pack is inserted into the first groove, the dimension in the direction of the first straight line of a cross section of the first battery pack in a plane perpendicular to the direction of the second straight line is smaller than the dimension of the cross section in the direction perpendicular to the first straight line and parallel to the plane.

In one example, at least one of the first battery pack of the power supply device is fixedly mounted to the main frame.

In one example, the user faces the forward direction of the electric riding machine when the user sits on the seat, and the at least one first battery pack is disposed on the rear side of the seat; wherein the power supply device further includes: a second battery pack disposed on the lower side of the seat.

In one example, the electric riding machine is a lawn mower, and the output member is a mowing element.

In one example, an electric riding lawn mower including: a seat for a user to ride; a main frame to support the seat; a power output assembly including a mowing element for outputting power to realize a mowing function and a first motor for driving the mowing element to output power; a walking assembly including a front travelling wheel and a rear travelling wheel configured to at least drive the electric riding lawn mower walking on the ground, and a second motor to drive the rear travelling wheel, wherein the rear travelling wheel has a rotating shaft; and a power supply device including a first battery compartment set, the first battery compartment set including one or more first battery compartments, at least a portion of the one or more first battery compartments being disposed on the rear side of the seat, wherein the one or more first battery compartments are for detachably mounting a first battery pack, and the first battery pack is further configured to power another power tool; wherein a horizontal distance between a center of all of the one or more first battery compartments disposed on the rear side of the seat and a rotating shaft of the rear travelling wheel is less than or equal to 300 mm.

In one example, a vertical distance between a center of all of the one or more first battery compartments disposed on the rear side of the seat and the rotating shaft of the rear travelling wheel is less than 300 mm.

In one example, the one or more first battery compartments disposed on the rear side of the seat is disposed on the rear side of the rear travelling wheel.

In one example, at least one of the one or more first battery compartments is disposed on the front side of the rear travelling wheel and under the seat.

In one example, all of the one or more first battery compartments are located on the rear side of the seat and on the rear side of the rotating shaft of the rear travelling wheel.

In one example, a distance between a center of all of the one or more first battery compartments disposed on the rear side of the seat and a center of a rotating shaft of the rear travelling wheel is less than 100 mm in a left-right direction of the electric riding lawn mower.

In one example, an electric riding lawn mower including: a seat for a user to ride; a main frame to support the seat; a power output assembly including a mowing element for outputting power to realize a mowing function and a first motor for driving the mowing element to output power; a walking assembly including a front travelling wheel and a rear travelling wheel configured to at least drive the electric riding lawn mower walking on the ground, and a second motor for driving the rear travelling wheel, wherein the rear travelling wheel has a rotating shaft; and a power supply device including one or more first battery compartments, at least a part of the one or more first battery compartments being disposed on the rear side of the seat, wherein the one or more first battery compartments are for detachably mounting a first battery pack, and the first battery pack is also configured to power another power tool; wherein a horizontal distance between a center of gravity of the electric riding lawn mower to which the first battery pack is mounted and the rotating shaft of the rear travelling wheel is less than or equal to 500 mm.

In one example, a vertical distance between a center of gravity of the electric riding lawn mower to which the first battery pack is mounted and a center of the rotating shaft of the rear travelling wheel is less than 300 mm.

In one example, the one or more first battery compartments disposed on the rear side of the seat are disposed on the rear side of the rear travelling wheel.

In one example, at least one of the one or more first battery compartments are disposed on the front side of the rear travelling wheel and under the seat.

In one example, all of the one or more first battery compartments are located on the rear side of the seat and on the rear side of the rear travelling wheel shaft.

In one example, a distance between a center of gravity of the electric riding lawn mower to which the first battery pack is mounted and a center of the rotating shaft of the rear travelling wheel are less than 100 mm in the lateral direction of the electric riding lawn mower.

In one example, an electric riding lawn mower including: a seat for a user to ride; a main frame to support the seat; a power output assembly including a mowing element for outputting power to realize a mowing function and a first motor for driving the mowing element to output power; a walking assembly including a front travelling wheel and a rear travelling wheel configured to at least drive the electric riding lawn mower walking on the ground, and a second motor to drive the rear travelling wheel, wherein the rear travelling wheel has a rotating shaft; and a power supply device including one or more first battery compartments, at least a part of the one or more first battery compartments being disposed on the rear side of the seat, wherein the one or more first battery compartments are used for detachably mounting a first battery pack, and the first battery pack is also configured to power another power tool; wherein when the first battery pack is mounted to the one or more first battery compartments, a upper portion of the first battery pack is substantially equal to or shorter than the seat in a height direction.

In one example, an electric riding lawn mower including: a seat for a user to ride; a main frame to support the seat; a power output assembly including a mowing element for outputting power to realize a mowing function and a first motor for driving the mowing element to output power; a walking assembly including a front travelling wheel and a rear travelling wheel configured to at least drive the electric riding lawn mower walking on the ground, and a second motor for driving the rear travelling wheel, wherein the rear travelling wheel has a rotating shaft; and a power supply device for providing power; wherein the power supply device is disposed on the rear side of the seat, and a upper side of the power supply device is substantially equal to or shorter than the seat in a height direction.

The present disclosure is advantageous in that the electric riding lawn mower of the present disclosure has high adaptability and low usage cost.

DETAILED DESCRIPTION

Figure 1:
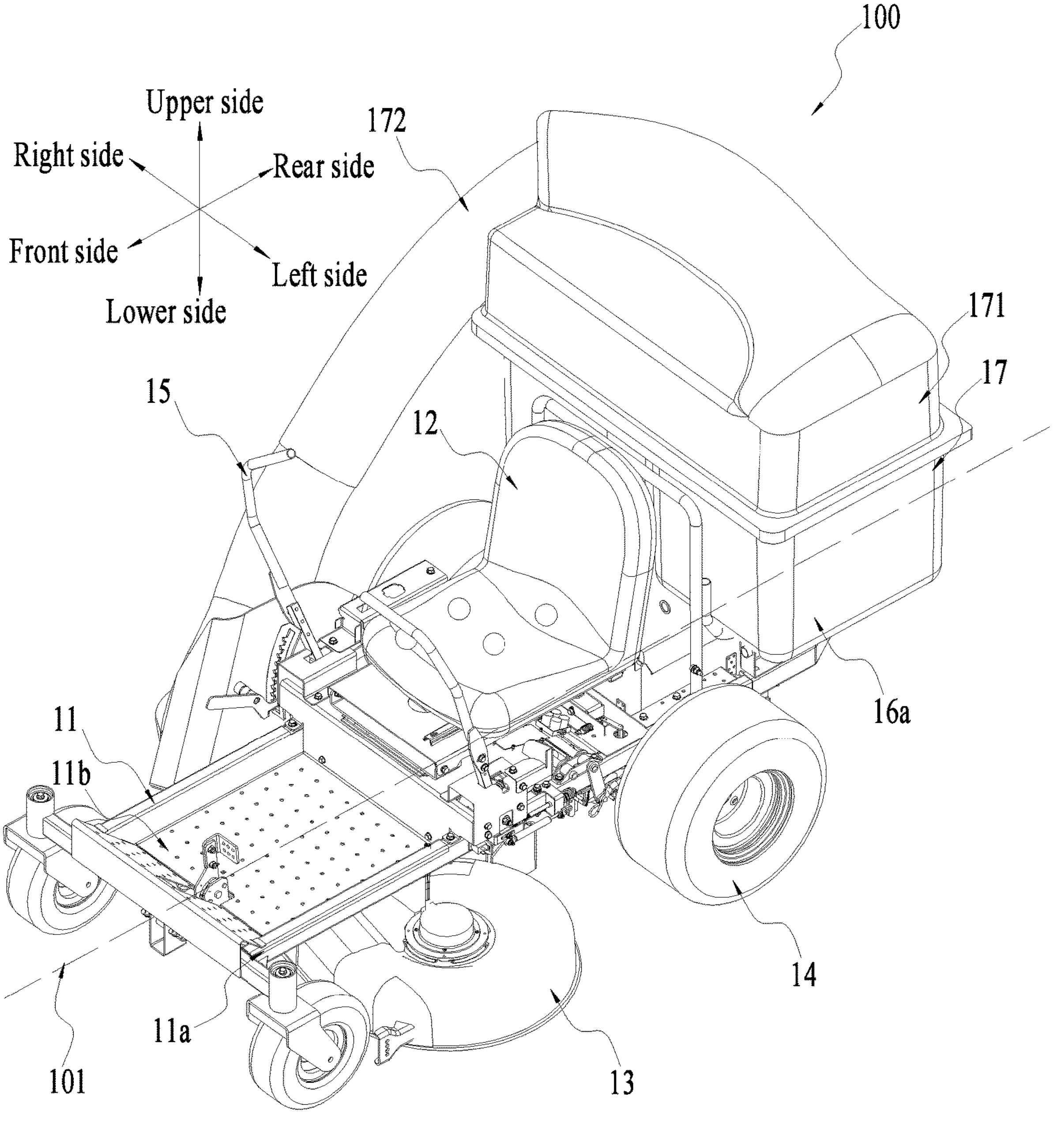
FIG. 1 is a perspective view of an electric riding lawn mower of a first example of the present disclosure when a grass collecting device is installed.
Figure 2:
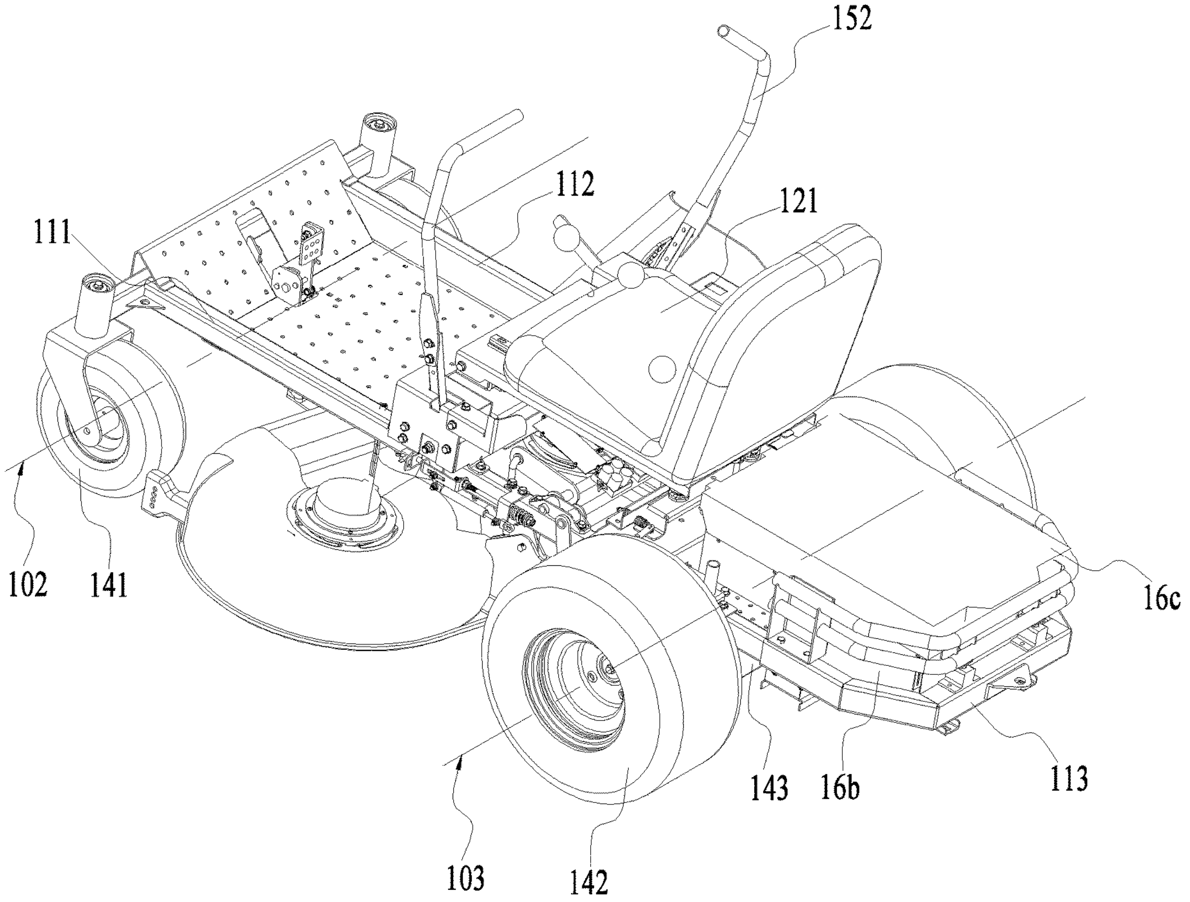
FIG. 2 is a perspective view of the electric riding lawn mower of FIG. 1 from another angle.

The electric riding machine shown in FIG. 1 can be an electric machine for working indoors or outdoors. In the present example, the electric riding machine is specifically exemplified by the electric riding lawn mower 100. The electric riding lawn mower 100 can be used for the user to ride. When sitting on the electric riding lawn mower, the user can effectively and quickly trim lawn, vegetation, etc. by operating the electric riding lawn mower. Comparing with walk behind lawn mowers, the electric riding lawn mower 100 of the present disclosure does not require the user to push the machine, nor does it require the user to walk on the ground, and because its large size brings longer endurance, the user is able to trim larger lawns, and trim for a long time with less tiredness. Furthermore, when it comes to power source, the electric riding lawn mower 100 uses electrical energy rather than gasoline or diesel used by existing riding lawn mowers; this not only costs less and is more environmental friendly, but also requires part replacement less often, reducing maintenance costs.

It can be understood that the electric riding machine may be other types of electric machines, as long as the electric machines can output power in other forms in addition to walking power to fulfil other functions besides walking, the electric machines can be considered as riding electric machines, such as riding snow throwers, riding agricultural machines, riding mops, riding sweepers and the like. In fact, as long as these tools include the substance described below in this disclosure, they all fall within the scope of this disclosure.

In order to facilitate the description of the technical solution of the present disclosure, the front side, the rear side, the upper side, the lower side, the left side, and the right side are defined as shown in FIG. 1.

As shown in FIGS. 1-12, the electric riding lawn mower 100 includes a main frame 11, a seat 12, a power output assembly 13, a walking assembly 14, an operating assembly 15, and a power supply device 16.

Figure 3:
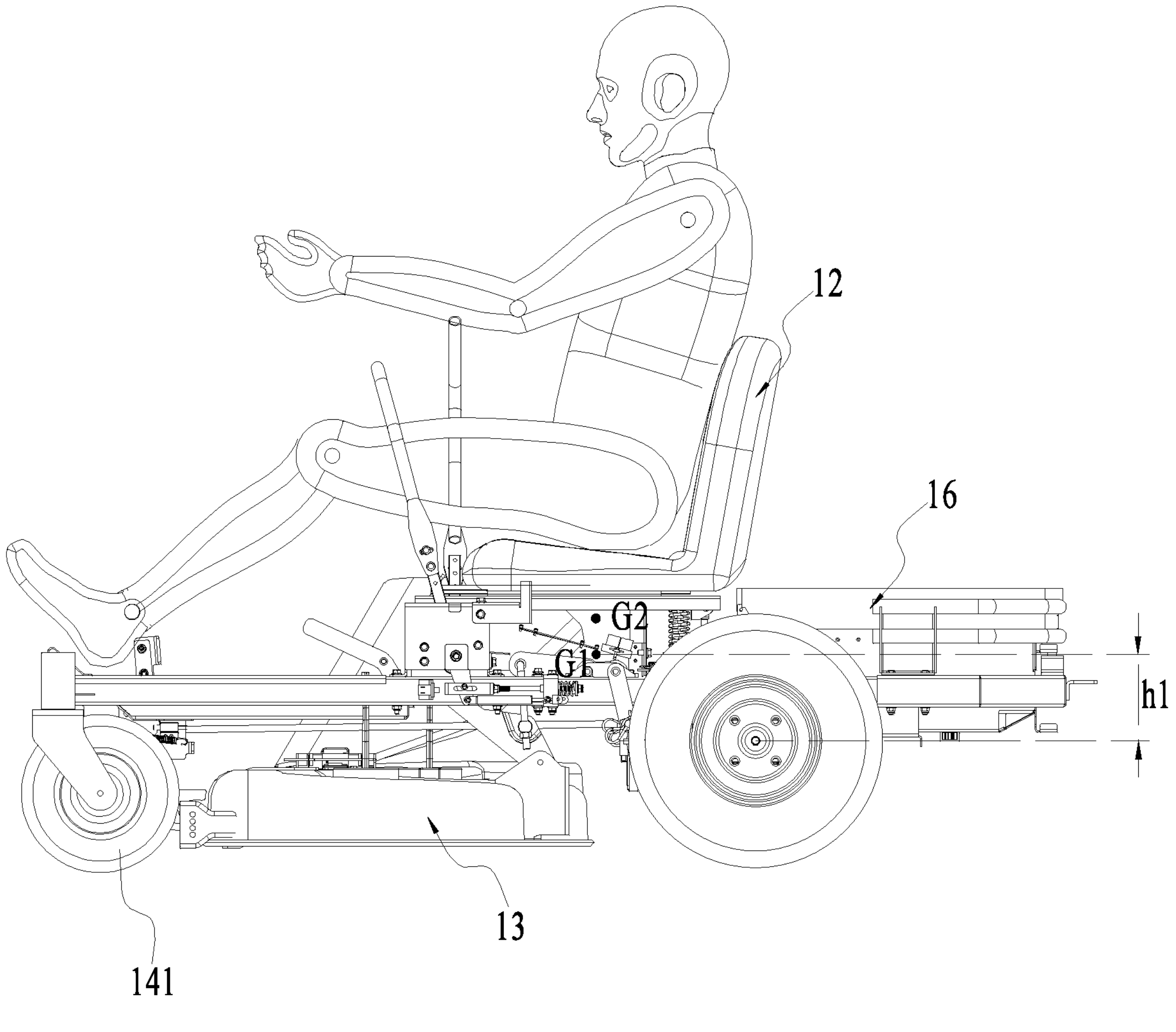
FIG. 3 is a plan view of a user riding the electric riding lawn mower of FIG. 1.
Figure 4:
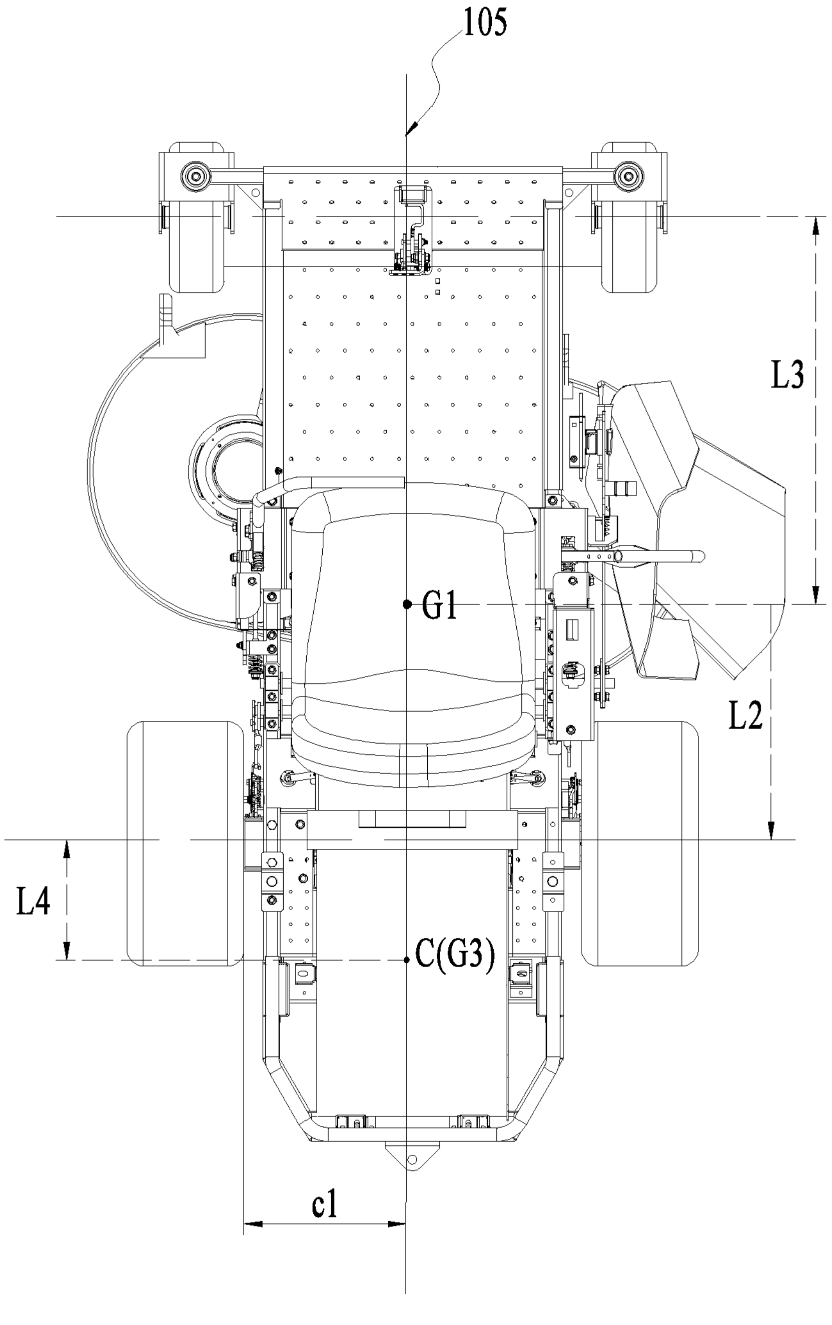
FIG. 4 is a top view of the electric riding lawn mower of FIG. 1.
Figure 5:
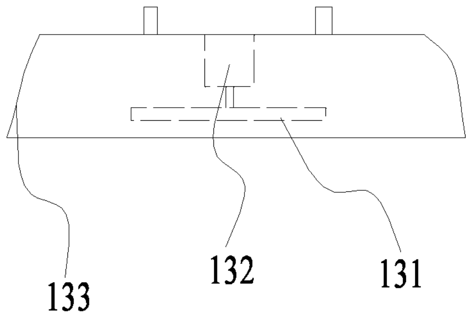
FIG. 5 is a schematic view of a power output assembly of FIG. 1.
Figure 6:
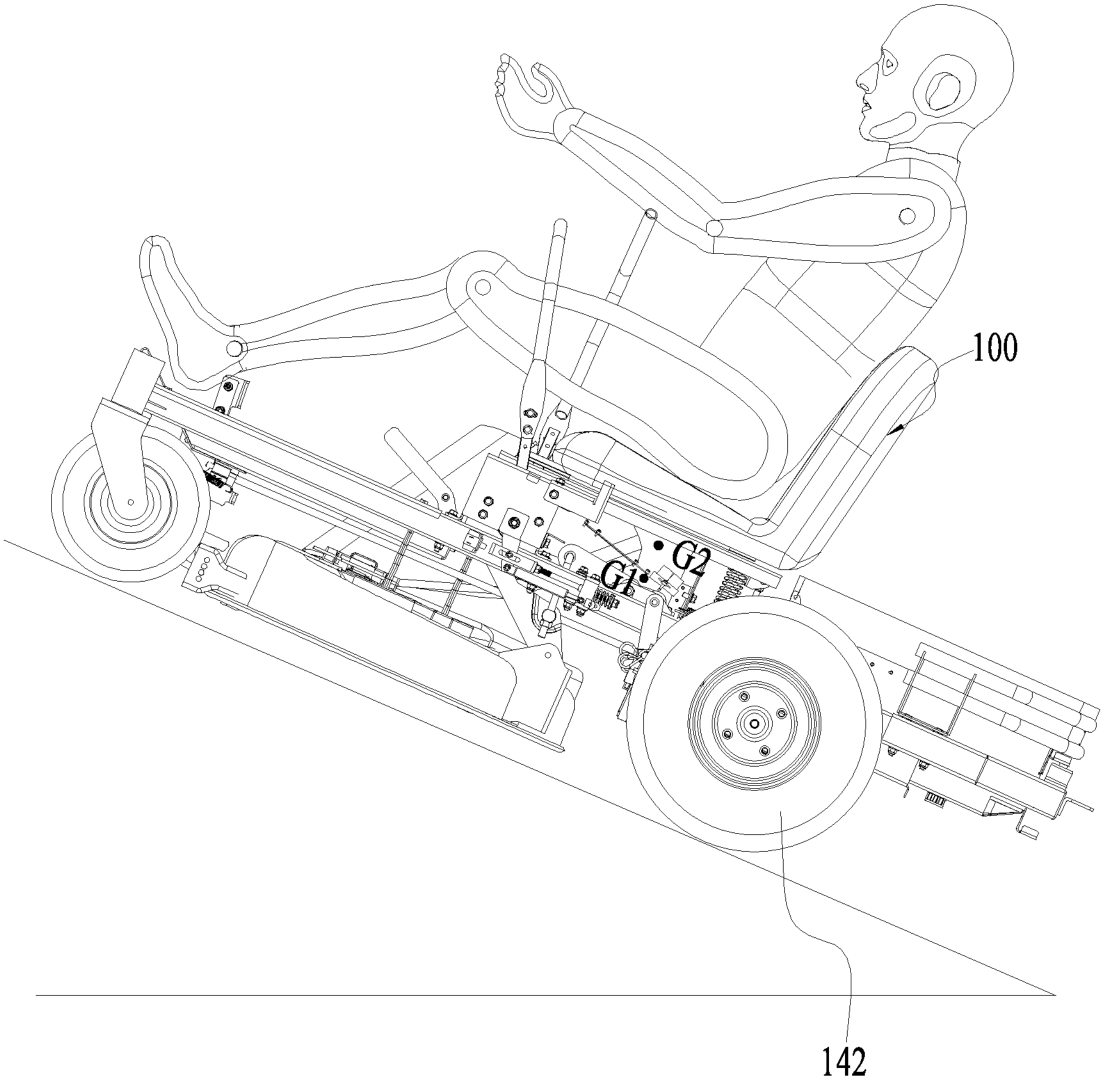
FIG. 6 is a plan view of a user climbing uphill on an electric riding lawn mower.
Figure 7:
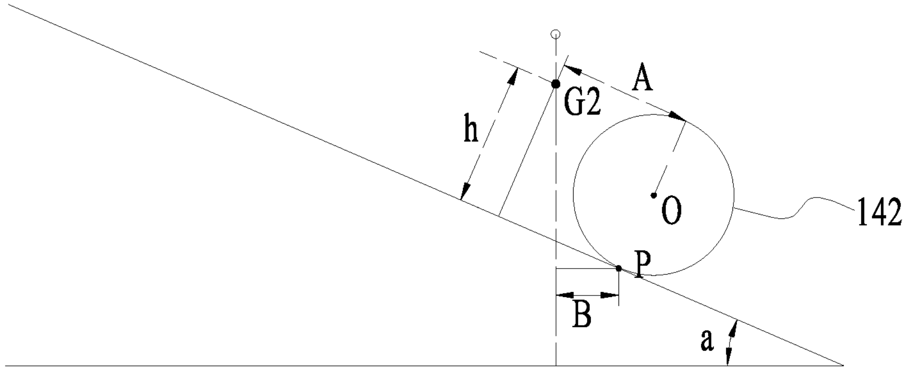
FIG. 7 is a schematic view showing a second travelling wheel and the centre of gravity of the entirety formed by a user and an electric riding lawn mower.
Figure 8:
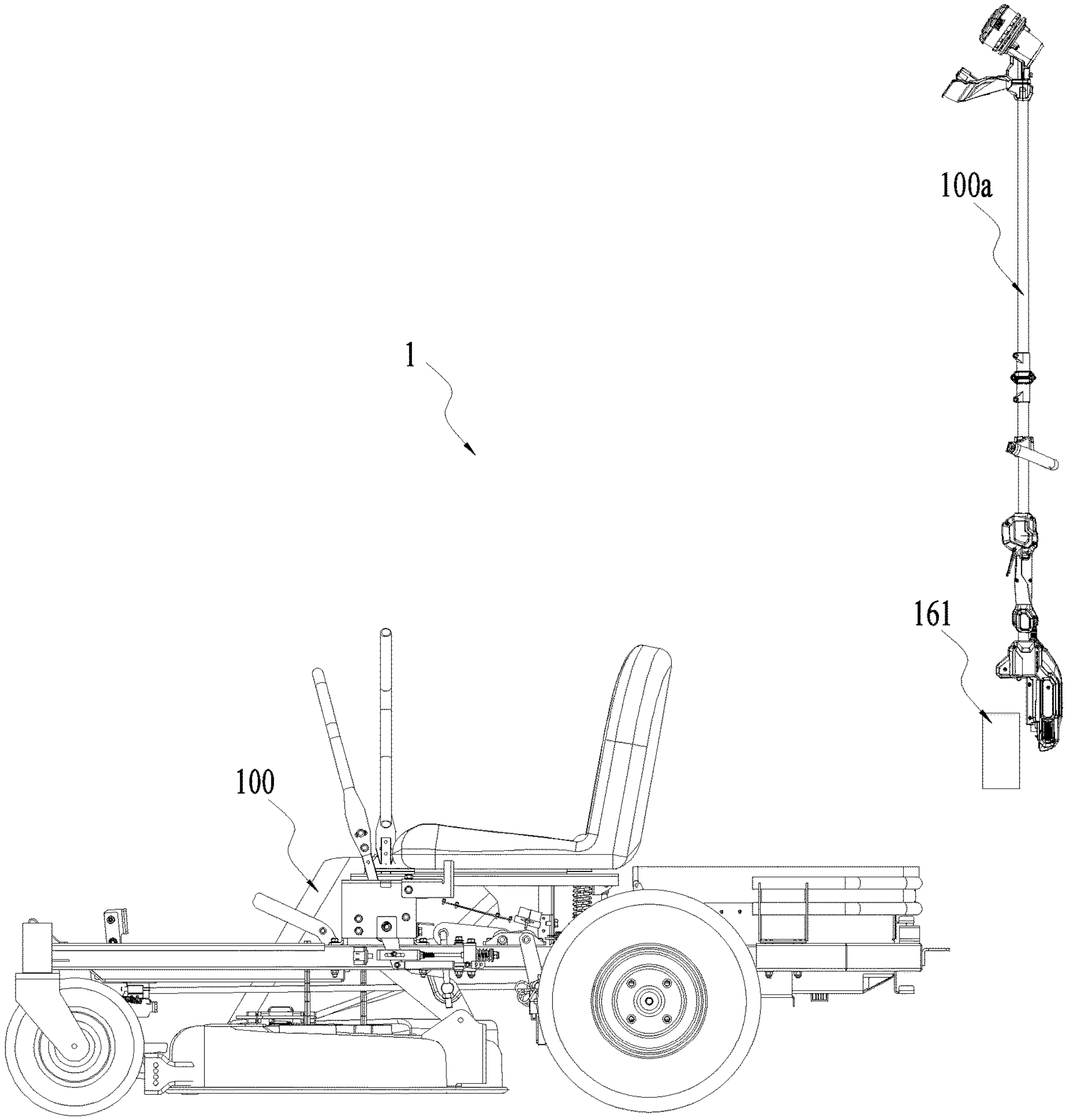
FIG. 8 is a schematic structural view of a power tool system.

The main frame 11 is used to carry various modules of the electric riding lawn mower 100. Specifically, the main frame is used to support the seat 12, the power output assembly 13, the walking assembly 14, the operating assembly 15, and the power supply device 16, and the like. The main frame 11 extends generally in the front-rear direction. Specifically, the main frame 11 extends at least partially in a direction parallel to a first straight line 101 in the front-rear direction. The main frame 11 includes a frame **11*a* and a base 11*b*. The frame 11*a* includes a first arm 111, a second arm 112, and a connecting arm 113 that connects the first arm 111 and the second arm 112. The connecting arm 113 connects the first arm 111 and the second arm 112 such that the first arm 111, the second arm 112, and the connecting arm 113 constitute a frame 11*a* that supports the base 11*b*. The first arm 111 and the second arm 112 may be in the front-rear direction. In the present example, the connecting arm 113 extends in the left-right direction; the number of the connecting arms 113 is two. One of the connecting arms 113 connects the first arm 111 and the second arm 112 at the front ends thereof, and the other connecting arm 113 connects the first arm 111 and the second arm 112 at the rear ends thereof, such that the first arm 111, the second arm 112 and the two connecting arms 113 form a substantially rectangular frame 11*a*. It is to be understood that the structure of the first arm 111, the second arm 112 and the two connecting arms 113 is not limited thereto, and the structure of the frame 11*a* is not limited thereto. The frame 11*a* surrounds the base 11*b*, and the shape of the base 11*b* is adapted to the shape of the frame 11*a*. In the front-rear direction, the base 11*b* is provided at the front of the frame 11*a*, the base 11*b* fills the front portion of the rectangular formed by the surrounding frame 11*a*, and the base 11*b* is at least partially extended in a plane extending in the front-rear direction, and the base 11*b* serves as a work platform to support the user's feet and some mechanisms that can be operated with the user's feet. The seat 12 is for a user to ride, and the seat 12 is mounted to the main frame 11. The seat 12 is slidable with respect to the main frame 11 in the direction of the first straight line 101, so that the seat 12 can be moved forward or backward, so that the user can adjust the position of the seat 12 in the front-rear direction according to the user's height and usage habits, aiding comfort of the electric riding lawn mower 100. The seat 12 specifically includes a bottom portion 121 and a backrest 122. The bottom portion 121 extends substantially in the front-rear direction, and the backrest portion 122 extends upward from the bottom portion 121. As shown in FIGS. 1 and 3, when the user sits on the seat 12, the user faces the forward direction of the electric riding lawn mower 100, i.e., the user faces the front side. The frame 11*a* can support the seat 12, it should be understood that the frame 11*a* may directly support the seat 12, and the frame 11*a* may also indirectly support the seat 12 by connecting to other structures. The seat 12 is provided on the upper side of the frame 11*a*. In the front-rear direction, at least half of the seat 12 is disposed on the rear side of the base 11*b*, so that when the user sits on the seat 12, the user's feet can be placed on the base 11*b* on the front side of the seat 12. In this way, on the one hand, the weight of the whole machine can be reduced, and the cost can be saved; on the other hand, the lower side of the seat 12** can free more space to set the other two parts, thereby saving space.

The power output assembly 13 includes an output member for outputting power to achieve a mechanical function. For example, in the present example, the output member may specifically be a mowing member 131. The power outputted by the power output assembly 13 is the power other than enabling the electric riding lawn mower 100 to walk on the ground, and different output members enable the power output assembly 13 to perform different functions, for example, the output member may blow the snow, the output member may sweep the ground, the output member may also plow the field, etc.

In the present example, the output member is the mowing element 131, which can realize the function of trimming the lawn, cutting the weeds, and the like. Specifically, the power output assembly 13 is also connected to the main frame 11, and in the present example, the power output assembly 13 can be specifically mounted to the lower side of the main frame 11. It should be understood that the main frame 11 may be directly connected to the power output assembly 13, and may also be indirectly connected through other connection structures to the power output assembly.

The power output assembly 13 is disposed substantially on the lower side of the main frame 11, which effectively utilizes the space on the lower side of the main frame 11, and reduces the size of the entire electric riding lawn mower 100 in the front-rear direction such that the whole structure is more compact. Furthermore, it also reduces the center of gravity G1 of the electric riding lawn mower 100, improves the stability of the electric riding lawn mower 100, and avoids the problem of machine rollover and backward turning during climbing.

The power output assembly 13 further includes: a first motor 132 and a chassis 133. The mowing element 131 is used to implement the mowing function; the first motor 132 is used to drive the mowing element 131 to rotate at a high speed; the chassis 133 is formed with an accommodation space to accommodate at least a portion of the first motor 132 and at least a portion of the mowing element 131. The power output assembly 13 may include one or more mowing element 131, and respectively, the number of the first motors 132 can correspond to the mowing element 131. For example, in the present example, the number of mowing elements 131 is two, which increases the cutting range of the electric riding lawn mower 100, thereby improving the cutting efficiency.

The walking assembly 14 is used to enable the electric riding lawn mower 100 to walk on the lawn and on the ground. In the up-down direction, the walking assembly 14 is also capable of supporting the main frame 11 and the various components on the main frame 11. The walking assembly 14 may specifically include a first travelling wheel 141 and a second travelling wheel 142. The first travelling wheel 141 is disposed on the front side of the second travelling wheel 142 in the front-rear direction. Therefore, the first travelling wheel 141 may also be defined as the front travelling wheel, and the second travelling wheel 142 may also be defined as the rear travelling wheel. In the present example, the number of the first travelling wheels 141 is 2, and the number of the second travelling wheels 142 is also 2, which can improve the stability of the electric riding lawn mower 100 in the left-right direction and avoid rollovers on the ground or up the hill. In fact, the walking assembly 14 may also include only one first travelling wheel 141 and two second travelling wheels 142; alternatively, the walking assembly 14 may include two first travelling wheels 141 and one second travelling wheel 142; wherein in the direction along the first straight line 101, the power output assembly 13 is at least partially disposed between the first travelling wheel 141 and the second travelling wheel 142.

Further, the power output assembly 13 is disposed substantially between the first travelling wheel 141 and the second travelling wheel 142; in the direction along the first straight line 101, the seat 12 is also at least partially disposed between the first travelling wheel 141 and the second travelling wheel 142, so that the center of gravity G1 of the electric riding lawn mower 100 is located between the first travelling wheel 141 and the second travelling wheel 142 in the direction of the first straight line 101, thereby improving the balance performance of the whole machine. Further, in the direction along the first straight line 101, the seat 12 is closer to the second travelling wheel 142 and further from the first travelling wheel 141, so that the electric riding lawn mower 100 can be effectively prevented from rollover during climbing. In the left-right direction, the two first travelling wheels 141 are respectively located at two sides of the main frame 11, and the two second travelling wheels 142 are also respectively located at two sides of the main frame 11; that is, the projections of the two first walking wheels 141 in a plane perpendicular to the up-down direction are outside the projection of the main frame 11 in the plane, and the projections of the two second walking wheels 142 in the plane are also located outside the projection of the main frame 11 in the plane. In this way, the main load-bearing portion of the electric riding lawn mower 100 can be placed between the two first travelling wheels 141 and also between the two second travelling wheels 142, so that the electric riding lawn mower 100 can be further effectively prevented from rolling over.

The first travelling wheel 141 may specifically be a universal wheel that can rotate about the first axis 102. The first travelling wheel 141 has a first diameter. It can be understood that since the first travelling wheel 141 is a universal wheel, the electric riding lawn mower 100 can turn, and when the electric riding lawn mower 100 turns, the first axis 102 of first travelling wheel 141 also rotates, and the orientation of the first travelling wheel 141 rotates. The walking assembly 14 also includes a second motor 143 for driving the second travelling wheel 142 to rotate about the second axis 103. The drive from the second motor 143 allows the walking assembly to drive the entire electric riding lawn mower 100 to walk on the ground. In this example, the second motor 143 is independent of the first motor 132 that drives the mowing element 131, so that the structure of the whole machine is simpler and the driving is more convenient. The number of the second motors 143 is also two, and the two second motors 143 are capable of driving the two second travelling wheels 142 respectively. Thus, when the two second motors 143 drive the respective second travelling wheels 142 at different rotational speeds, a speed difference is generated between the two second travelling wheels 142, thereby causing the electric riding lawn mower 100 to turn. The second travelling wheel 142 has a second diameter, and the second diameter of the second travelling wheel 142 is greater than the first diameter of the first travelling wheel 141. Wherein, the second diameter of the second travelling wheel 142, the ratio of the second diameter of the second travelling wheel 142 to the first diameter of the first travelling wheel 141 is greater than or equal to 1.4 and less than or equal to 2, such that the second diameter of the second travelling wheel 142 is larger than the first diameter of the first travelling wheel 141, so that the electric riding lawn mower 100 is less likely to roll backward when climbing uphill. Of course, the second diameter of the second travelling wheel 142 cannot be excessively larger than the first diameter of the first travelling wheel 141 to avoid the risk of the electric riding lawn mower 100 rolling forward on the downhill slope.

In the present example, the distance between the second travelling wheel 142 and the center of the two second travelling wheels 142 is defined as c1, i.e., half of the distance between the two second travelling wheels 142 is considered to be c1. In the present example, with a large number of modelling, test analyses, theoretical analysis, and creative work on the electric riding lawn mower 100, it is concluded that in order to avoid rollover when the electric riding lawn mower 100 climbs the uphill, the ratio of the distance c1 between the second travelling wheel 142 and the center of the two second travelling wheels 142 to the second diameter of the second travelling wheel 142 is greater than or equal to 0.5 and less than or equal to 1, such that the distance c1 between the second travelling wheel 142 and the center of the two second travelling wheels 142 is not excessively large, and the turning radius of the entire electric riding lawn mower 100 can be reduced, thereby making the electric riding lawn mower 100 turns faster.

Further, the distance between the center of gravity G1 of the electric riding lawn mower 100 and the two second travelling wheels 142 in the up-down direction is defined as h1, The ratio of the distance h1 to the second diameter of the second travelling wheel 142 is greater than or equal to 0.5 and less than or equal to 0.5 and less than or equal to 1, such that when the second diameter of the second travelling wheel 142 is fixed, the center of gravity G1 of the electric riding lawn mower 100 can be placed in a reasonable position in the up-down direction. Therefore, the risk of rollover of the electric riding lawn mower 100 during climbing is reduced. The position of the center of gravity G1 of the electric riding lawn mower 100 can be reasonably improved as the second diameter of the second travelling wheel 142 is increased. In the present example, the ratio of the distance h1 between the center of gravity G1 of the electric riding lawn mower 100 and the center of the two second travelling wheels 142 in the up-down direction to the distance c1 between the second travelling wheel 142 and the center of the two second travelling wheels 142 is greater than or equal to k1 and less than or equal to k2, that is, k1≤h1/c1≥k2, and the setting of k1 and k2 is related to the dimension of the second diameter of the second travelling wheel 142. Thus, when the second diameter of the second travelling wheel 142 is set, k1 and k2 can also be set to a reasonable value. Thus, when the distance c1 between the second travelling wheel 142 and the center of the two second travelling wheels 142 is set small, the rollover issue during climbing can be alleviated by lowering the center of gravity G1 of the electric riding lawn mower 100.

When the center of gravity G1 of the electric riding lawn mower 100 is set high, the distance c1 between the second travelling wheel 142 and the center of the two second travelling wheels 142 can be increased to prevent the electric riding lawn mower 100 from rollover during climbing. For example, in the present example, k1 has a value of 0.6 and k2 has a value of 1.1, such that 0.6≤h1/c1≥1.1. More specifically, in a direction perpendicular to the first straight line 101 and perpendicular to the second axis 103, the distance L1 between the center of gravity G1 of the electric riding lawn mower 100 and the second axis 103 is greater than or equal to 0 and less than or equal to 150 mm, that is, the distance L1 is greater than or equal to 0 and less than or equal to 150 mm in the up-down direction, so that the center of gravity G1 of the electric riding lawn mower 100 is not too high in the up-down direction. When the user sits on the seat 12, the center of gravity will rise to some extent, but since the center of gravity G1 of the electric riding lawn mower 100 is set low, the center of gravity G2 of the entirety formed by the user and the electric riding lawn mower 100 is not too high in the up-down direction, which improves stability. It should be noted that, in the present disclosure, the distance between two points, lines and planes in a certain direction refers to the projection distance of the spatial distance between them in the specified direction.

The operating assembly 15 is for user operation to control the electric riding lawn mower 100 to walk and output power. The operating assembly 15 can include a first operating element and a second operating element 152. The first operating element is for user to operate to activate the first motor 132 in the power output assembly 13 to control the mowing element 131 to mow. The second operating element 152 is for user to operate to activate the second motor 143 in the walking assembly 14 to control the electric riding lawn mower 100 to walk on the lawn or on the ground. The number of second operating elements 152 is two. In the present example, two of the second operating elements 152 are used to respectively control two of the second motors 143. The two second operating members 152 are respectively disposed on both sides of the seat 12 such that the two second operating members 152 on both sides can be more conveniently operated when the user sits on the seat 12.

The power supply device 16 is for supplying power to the first motor 132 and the second motor 143. The power supply device 16 includes a plurality of first battery packs 161. Compared with the conventional riding lawn mowers powered by gasoline, the electric riding lawn mower 100 powered by the first battery pack 161 is more environmental friendly and the later usage cost is also lower. In the long run, the cost of the electric riding lawn mower using the first battery pack 161 will be lower. Compared with riding lawn mowers powered by alternating current, the first battery pack 161 supplies power without using a long power cord, which is safer and more convenient for mowing. In the present disclosure, the first battery pack 161 is a lithium battery pack, and the first battery pack 161 is lighter in weight, higher in charge and discharge efficiency, and longer in service life than other types of battery packs (for example, lead-acid batteries). Further, in the present example, the voltage of the first battery pack 161 is 56V Of course, it can be understood that the voltage value of the first battery pack 161 is not limited thereto.

The power supply device 16 is disposed on the rear side of the seat 12, and in the height direction, the upper end of the power supply device 16 is shorter than the seat 12, or the upper end of the power supply device 16 is substantially of the same height to the seat 12; further, in the height direction, the upper end of the first battery pack 161 is shorter than the seat 12, or the first battery pack 161 is substantially of the same height to the seat 12.

In the present example, the first battery pack 161 can be detached from the main frame 11 by the user, that is, the first battery pack 161 for powering the electric riding lawn mower 100 is detachably mounted to the main frame 11, so that when the power of the first battery pack 161 is insufficient, the user can detach the first battery pack 161 for charging, instead of directly charging the electric riding lawn mower 100, thereby improving operational convenience; in addition, when the first battery pack 161 is damaged, the user can conveniently disassemble the first battery pack 161 for maintenance or directly replace the first battery pack 161, which avoids fixing or replacing the riding lawn mower whose battery pack cannot be disassembled, and thus reduces the cost of maintenance at a later stage. Moreover, the ability to disassemble the first battery pack 161 also allows for differentiated design of products for different platforms or regions, making quality control and manufacture of the entire electric riding lawn mower 100 easier. Still alternatively, the power tool system 1 shown in FIG. 8 includes the electric riding lawn mower 100 and a power tool 100*a* in the present disclosure. Wherein, the first battery pack 161 in the power supply device 16 for supplying power to the electric riding lawn mower 100 can be detached and mounted into the electric power tool 100*a*, so that the first battery pack 161 can also power the electric power tool 100*a*, that is, the first battery pack 161 in the power supply device 16 in the present disclosure can be applied not only to the electric riding lawn mower 100 but also to other electric power tools 100*a*, thereby improving the adaptability of the first battery pack 161 and the ability of the electric riding lawn mower 100 to adapt to the first battery pack 161. Thus, when the electric riding lawn mower 100 is not in use, the user can disassemble the first battery pack 161 for use in other electric power tools 100*a*, thereby avoiding waste of resources and reducing usage cost. In other words, when the user needs to use the electric riding lawn mower 100, the user can borrow the battery pack in other power tool 100*a* as the first battery pack 161. In the present example, the first battery pack 161 is configured to be pluggably mounted by the user to the electric riding lawn mower 100, and the first battery pack 161 is attached and detached by plugging and unplugging, making the operation more convenient, and the positioning of the first battery pack 161 more accurate.

Figure 9:
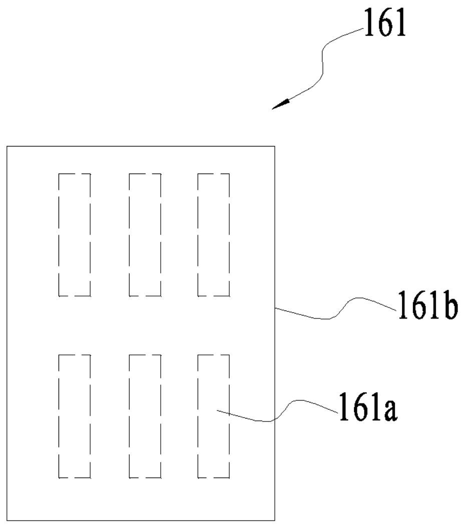
FIG. 9 is a schematic structural view of a first battery pack of FIG. 1.
Figure 10:
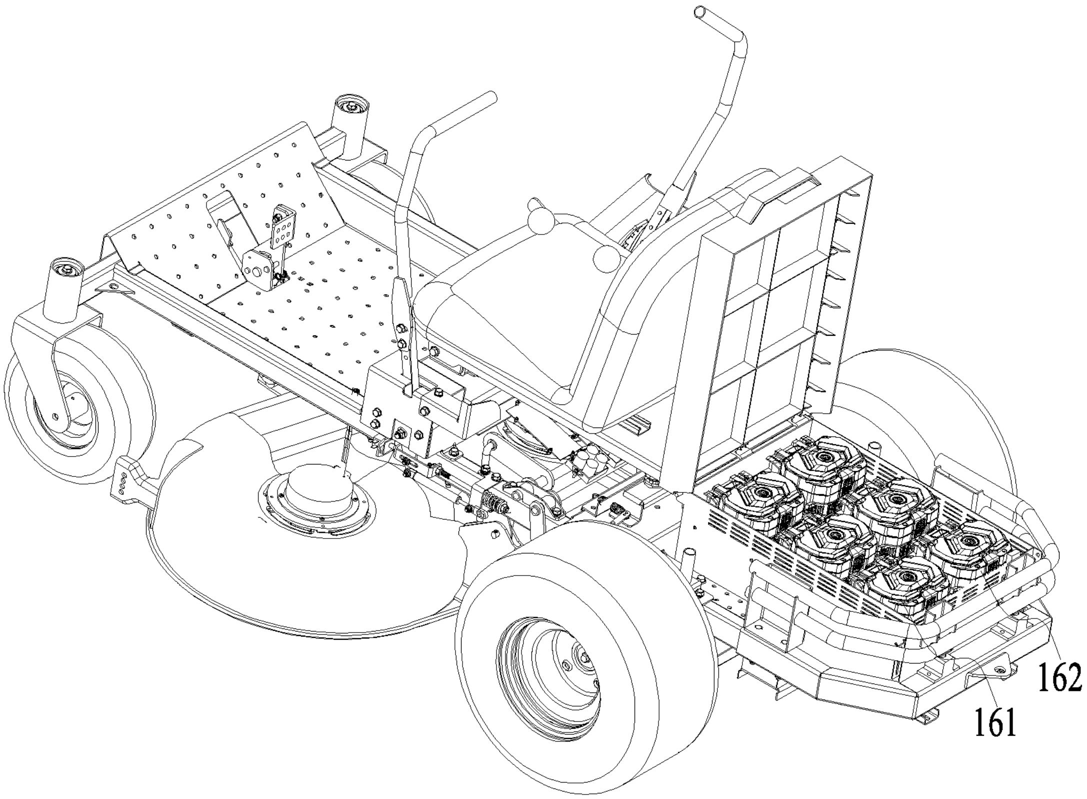
FIG. 10 is a perspective view of the electric riding lawn mower of FIG. 1 when a cover is opened.
Figure 11:
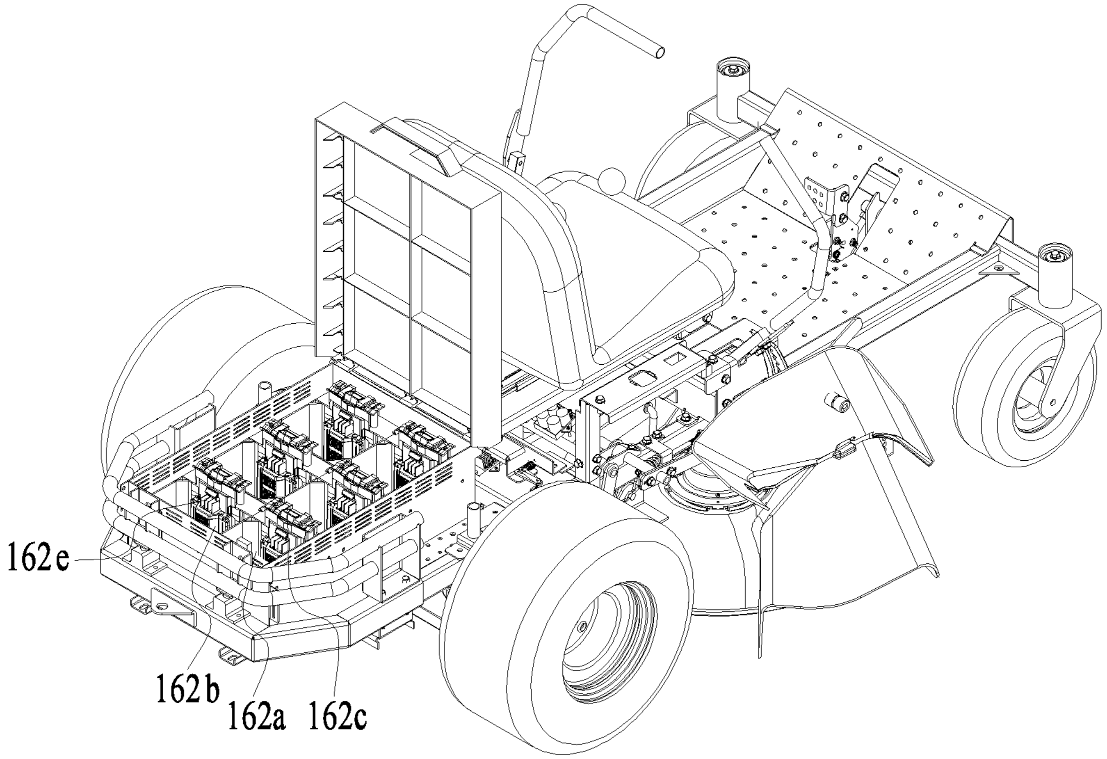
FIG. 11 is a perspective view of the electric riding lawn mower of FIG. 1 when a first battery pack is removed.

Further, as shown in FIG. 9, the first battery pack 161 includes a plurality of battery cells 161*a* connected in series, in parallel, or in a combination of series and parallel. The plurality of battery cells 161*a* are combined in one battery case to constitute a whole, and the battery cells 161*a* may specifically be lithium-based. Specifically, the power tool 100*a* may be a garden tool such as a string trimmer, a hedge trimmer, a blower or a chain saw, a torque output tool such as an electric drill or an electric hammer, a sawing tool such as an electric circular saw, a curve saw or a reciprocating saw, or a grinding tool such as an angle grinder or a sander. Of course, in other examples, the first battery pack 161 can also be configured to power a hand-push power tool, such as a hand-push lawn mower, a hand-push snow blower, and the like. Thus, the first battery pack 161 of the present disclosure adapted to the electric riding lawn mower 100 can be pulled out by the user to be applied to the above power tool 100*a*, in other words, the user can borrow the battery packs in the power tool 100*a* as the first battery pack 161 to power the electric riding lawn mower 100, thereby improving the versatility of the electric riding lawn mower 100 and reducing the usage cost.

In the present example, the area surrounded by the frame 11*a* may be divided into a front portion, a middle portion, and a rear portion in the front-rear direction. The base 11*b* only fills the front portion of the frame 11*a*, and the middle portion and the rear portion of the frame 11*a* are not provided with the base 11*b*, and the seat 12 is provided on the upper side of the middle portion of the frame 11*a*, so that the lower side of the seat 12 and the middle portion of the frame 11*a* have more space to for other components, so that the structure of the whole machine is more compact. The rear portion of the frame 11*a* and the rear side of the seat have a sufficiently large accommodation space which can be used to house the power supply device 16. In the present example, the number of the first battery packs 161 included in the power supply device 16 is plural; the number of the first battery packs 161 is at least 4; the number of the first battery packs 161 is greater than or equal to 4 and less than or equal to 10. Further, in the present example, the number of the first battery packs 161 is exemplified by six, so that the electric riding lawn mower 100 is powered by the plurality of first battery packs 161, and on the other hand, the endurance capability of the entire electric riding lawn mower 100 is improved, thereby avoiding the trouble of repeated charging, and improving the efficiency of work; on the other hand, the power supply device 16 includes a plurality of first battery packs 161, and thus the weight of the power supply device 16 is heavier. For the entire electric riding lawn mower 100, the weight of the power supply device 16 makes up a large proportion of the weight of the entire electric riding lawn mower 100. Therefore, disposing the power supply device 16 in the rear end of the frame 11*a* and on the rear side of the seat 12 locates the power supply device 16 at the rear end of the electric riding lawn mower 100, thereby enabling the center of gravity G1 of the electric riding lawn mower 100 to move backward, further reducing the possibility of rolling over backwards when the electric riding lawn mower 100 climbs the slope, and improving the safety performance.

Further, the center of gravity G1 of the electric riding lawn mower 100 is disposed on the lower side of the seat 12. For the entire electric riding lawn mower 100, the seat 12 is substantially in the middle position in the front-rear direction, and the center of gravity G1 of the electric riding lawn mower 100 is disposed on the lower side of the seat 12; thus, the user sitting on the seat 12 only causes the center of gravity G2 of both the user and the electric riding lawn mower 100 to change only in the up-down direction with respect to the center of gravity G1 of the electric riding lawn mower 100 when the user is not sitting on the seat 12. The position of the center of gravity G2 does not change in the front-rear direction and the left-right direction, so that the risk of rollover caused by the user sitting on the seat 12 can be further reduced. The center of gravity G1 of the electric riding lawn mower 100 is disposed on the lower side of the seat 12. Therefore, regardless of whether a user with a relatively heavy weight or a user with a relatively light weight operates the electric riding lawn mower 100, the center of gravity G2 of the entirety constructed by the user and the electric riding lawn mower 100 will not change in the left-right direction and the front-rear direction, thereby improving the stability of the electric riding lawn mower 100.

As described above, when the center of gravity G1 of the electric riding lawn mower 100 is lowered in the up-down direction, and if the user sits on the seat 12, the center of gravity G2 of the entirety constructed by the user and the electric riding lawn mower 100 will also decline relatively. Thus, when the user rides the electric riding lawn mower 100 of the present disclosure to climb a slope, the second travelling wheel 142 has a contact point P with the slope surface, and the projection distance between the center of gravity G2 of the entirety constructed by the user and the electric riding lawn mower 100 and the contact point P in the horizontal direction is B. In the direction perpendicular to the first line 101 and perpendicular to the second axis 103, the distance between the center of gravity G2 of the entirety constructed by the user and the electric riding lawn mower 100 and the slope surface is h, that is, in the direction perpendicular to the slope surface, the distance between the center of gravity G2 of the entirety constructed by the user and the electric riding lawn mower 100 and the slope surface is h. Wherein, the following relationship is satisfied between the projection distance B and the distance h:

$$B=A*\cos\alpha-h*\sin\alpha,$$

Wherein, A is the distance between center of gravity G2 of the entirety constructed by the user and the electric riding lawn mower 100 and the second axis 103 of the second travelling wheel 142; the angle α is the angle between the slope surface and the horizontal plane.

From the above relationship between the projection distance B and the distance h, the distance A between center of gravity G2 of the entirety constructed by the user and the electric riding lawn mower 100 and the second axis 103 of the second travelling wheel 142 is fixed; and when the angle α formed between the slope surface and the horizontal plane is also fixed, the smaller the distance h between the center of gravity G2 of the entirety constructed by the user and the electric riding lawn mower 100 and the slope surface in a direction perpendicular to the first straight line 101 and perpendicular to the second axis 103, the larger the projection distance B between the center of gravity G2 of the entirety constructed by the user and the electric riding lawn mower 100 and the contact point P in the horizontal direction, which makes the electric riding lawn mower 100 easier to climb and less likely to roll over.

The chassis 133 and the main frame 11 also need to be separated by a certain distance to allow the chassis 133 to waggle up and down. Specifically, the distance between the chassis 133 and the main frame 11 should be greater than or equal to 20 mm and less than or equal to 60 mm. In another example, it is also necessary to make the distance between the mowing element 131 and the ground satisfy the requirement of mowing. Specifically, the distance between the mowing element 131 and the ground should be greater than or equal to 20 mm and less than or equal to 120 mm. In another example, in the present example, the power of the first motor 132 is greater than or equal to 500 W and less than or equal to 1500 W, and therefore, the size of the space inside the chassis 133 also needs to meet the size of the first motor 133.

In the direction along the first straight line 101, the distance L2 between the center of gravity G1 of the electric riding lawn mower 100 and the second axis 103 is greater than or equal to 0 and less than or equal to 400 mm, such that the electric riding lawn mower 100 is not likely to roll over during climbing. In the direction along the first straight line 101, The ratio of the distance L3 between the center of gravity G1 of the electric riding lawn mower 100 and the first axis 102 to the distance L2 between the center of gravity G1 of the electric riding lawn mower 100 and the second axis 103 is greater than or equal to 2 and less than or equal to 4, so that the center of gravity G of the electric riding lawn mower 100 is set at a proper position in a direction along the first straight line 101. Therefore, not only can the climbing ability be taken into account, but also the problem of rollover when climbing uphill can be taken into account, and the problem of the overturning when going downhill with the electric riding lawn mower 100 can also be avoided.

The power supply device 16 includes a battery compartment housing **16*a* that includes a main body portion 16*b* and a cover 16*c* that is pivotally coupled to the main body portion 16*b*. The main body portion 16*b* may include a first battery compartment 162 for mounting the first battery pack 161, and the power supply device 16 may include two or more first battery compartments 162, and the number of the first battery compartments 162 may also be a specific plural. Specifically, in this example, the power supply device 16 includes six first battery compartments 162, and the six first battery compartments 162 are disposed on the rear side of the seat 12 away from the first travelling wheel 141, that is, in the direction of the first straight line 101, the first battery compartment 162 and the first travelling wheel 141 are respectively disposed on both sides of the seat 12. In this way, the weight of the electric riding lawn mower 100 can be shifted back, thereby increasing the positive pressure of the second travelling wheel 142 at the rear end to the ground, thereby increasing grip of the second travelling wheel 142 of the electric riding lawn mower 100**, and making climbing uphill easier.

Correspondingly, the power supply device 16 includes six first battery packs 161, and each of the first battery packs 161 can be respectively mounted to each of the first battery compartments 162. The first battery compartment 162 may be formed with a first groove **162*a*. The first battery pack 161 can be detachably inserted into the first groove 162*a* along the direction of the second straight line 104. The first battery pack 161 can also be pulled out of the first groove 162*a* along the direction of the second straight line 104. The cover 16*c* has an open state and a closed state, and when the cover 16*c* is in the open state, the first groove 162*a* is opened and the user can insert the first battery pack 161 into the first groove 162*a*; when the cover 16*c* is in the closed state, the first groove 162*a* is closed to provide a certain protection to the first battery pack 161 located in the battery compartment housing 16*a*. It can be understood that the first battery compartment 162 can also be provided with a guiding structure 162*b* for guiding the first battery pack 161 to be inserted into the first groove 162*a* in the direction of the second straight line 104, such that the first battery pack 161 can be positioned more accurately in the first groove 162*a*. The first battery compartment 162 may also be provided with a latch 162*c* for locking the first battery pack 161 in the first groove 162*a*. The latch 162*c* can lock the first battery pack 161, and allow the first battery pack 161 to be pulled out. In this way, the waggle of the first battery pack 161 can be avoided. The first battery compartment 162 may also be provided with a pop-up structure 162*d* for ejecting the first battery pack 161, thereby enabling the user to pull out the first battery pack effortlessly. The first battery compartment 162 is further provided with an input terminal 162*e* to electrically connect to the first battery pack 161, and the input terminal 162*e* is for introducing the electric energy output by the first battery pack 161 to the electric riding lawn mower 100**.

The direction of the second straight line 104 in which the first battery pack 161 is inserted into the first groove **162*a* obliquely intersects with the direction of the first straight line 101. Further, between the direction of the second straight line 104 and the direction of the first straight line 101, an angle greater than 60 degrees and less than 90 degrees may be formed, enabling the user to easily insert and remove the first battery pack 161 without squatting. That is, the angle formed between the direction of the second straight line 104 in which the first battery pack 161 is inserted into the first groove 162*a* and the straight line extending in the up-down direction is greater than 0 degrees and less than or equal to 30 degrees, so that the user can easily insert and remove the first battery pack 161 without bending largely, thereby making the operation more effortless, and avoiding the user twisting or bending the arm when pulling out the first battery pack 161, thereby facilitating the human-machine experience. It can be understood that the six first battery compartments 162 can also be formed by a single larger battery compartment, that is, the power supply device 16 may include only one battery compartment, and the plurality of first battery packs 161** are all installed in this battery compartment.

Alternatively, the power supply device 16 may include only one first battery compartment 162; correspondingly, the power supply device 16 may include only one first battery pack 161. That is to say, the number of the first battery compartments 162 and the number of the first battery packs 161 are not specifically limited, and the correspondence relationship between the first battery compartment 162 and the first battery pack 161 is not limited to the one-to-one correspondence relationship. It can be understood that, in other examples, the direction of the second straight line 104 in which the first battery pack 161 is inserted into the first groove 162*a* may also be perpendicular to the direction of the first straight line 101, and the direction of the second straight line 104 in which the first battery pack 161 is inserted into the first groove 162*a* may also be parallel to the direction of the first straight line 101.

In the example, the power supply device 16 includes six first battery packs 161, and the six first battery packs 161 are disposed on the rear side of the seat 12. The six first battery packs 161 are arranged in a regular shape on the rear side of the seat 12. The first battery compartment 162 disposed on the rear side of the seat 12 is further disposed on the rear side of the second travelling wheel 142. The first battery pack 161 has a height direction extending in the direction in which it is inserted into the first groove 162*a*, and has a longitudinal direction and a width direction perpendicular to the height direction; the dimension of the first battery pack 161 in the longitudinal direction is greater than the dimension thereof in the width direction. In this example, when the first battery pack 161 is inserted into the first groove 162*a*, the longitudinal direction of the first battery pack 161 and the second axis 103 of the second travelling wheel 142 are parallel to each other, that is, the longitudinal direction of the first battery pack 161 extends in the left-right direction. Thus, when the user needs to install or remove the first battery pack 161, the user does not need to twist the wrist, which improves the comfort of operation.

More specifically, the six first battery packs 161 are arranged in three rows in the front-rear direction, and each row has two first battery packs 161 arranged in the left-right direction. The two first battery packs 161 disposed in the left-right direction are defined as one battery unit group, or form a modular power supply device, and the length of the first battery pack 161 in the left-right direction is greater than the width thereof in the front-rear direction. Thus, two first battery packs 161 are arranged on a straight line parallel to the left-right direction, and three first battery packs 161 are arranged on a straight line parallel to the front-rear direction, and the orientation of each first battery pack 161 is arranged such that its length in the left-right direction is also greater than its length in the front-rear direction. Thus, the dimension of the six first battery packs 161 is not excessively long in the front-rear direction so as not to increase the size of the entire electric riding lawn mower 100 in the front-rear direction; and also the dimension of the six first battery packs 161 is not too small in the left-right direction to effectively utilize the space occupied by the electric riding lawn mower 100 in the left-right direction. Thereby, the arrangement of the power supply device 16 is more reasonable, the space is saved, and the modularization is facilitated. Of course, it can be understood that when two first battery packs 161 in the power supply device 16 are used as one battery unit group, the power supply device 16 may also include two battery unit groups, and may further include three or more battery unit groups, thereby facilitating modularization of the power supply device 16 and implementation of a variety of configurations.

In the present example, the capacity of a first battery pack 161 is greater than or equal to 130 Wh and less than or equal to 1000 Wh. Further, the capacity of a first battery pack 161 is greater than or equal to 130 Wh and less than or equal to 500 Wh, so that the discharge time of the first battery pack 161 can also meet the most basic requirements even when only one first battery pack 161 is included in the power supply device 16; or, when the plurality of first battery packs 161 included in the power supply device 16 are out of power and the electric riding lawn mower 100 needs to perform mowing, one first battery pack 161 or two first battery packs 161 may be charged first, and after the charging is completed, the one first battery pack or the two first battery packs 161 are inserted to the first battery compartment 162 to supply power. Therefore, because the capacity of the first battery pack 161 is greater than or equal to 130 Wh, the discharge time of the first battery pack 161 can meet the urgent needs of the user to cut a part of the grass, in other words, does not delay the use. It can be understood that, in the present disclosure, when any of the first battery packs 161 is installed in the battery compartment housing 16*a*, the electric riding lawn mower 100 can be operated, that is, in the present disclosure, the electric riding lawn mower 100 is not limited to operate only if all of the first battery compartments 162 are installed with the first battery packs 161 capable of supplying power. Alternatively, when the plurality of first battery packs 161 are mounted to the battery compartment housing 16*a*, and some of the first battery packs 161 are depleted, the electric riding lawn mower 100 can still operate, thereby improving work efficiency. Further, in the present example, the weight of one first battery pack 161 is greater than or equal to 0.1 kg and less than or equal to 4 kg, which eases carrying difficulties due to the excessive weight of the first battery pack 161. Further, for considerations to allow the electric riding lawn mower 100 of the present disclosure to borrow battery packs in other electric power tools, it is also necessary to make the weight of the first battery pack 161 equal to or greater than 0.1 kg and equal to or less than 4 kg. More preferably, the weight of the first battery pack 161 is greater than or equal to 1 kg and less than or equal to 4 kg, so that the first battery pack 161 can satisfy the capacity and discharge time demands when the weight of the first battery pack 161 is not excessively heavy.

On the other hand, the ratio of the discharge power of a single first battery pack 161 to the nominal voltage of the first battery pack 161 is greater than or equal to 10 W/V and less than or equal to 25 W/V, and further, the ratio of the discharge power of a single first battery pack 161 to the nominal voltage of the first battery pack 161 is greater than or equal to 12 W/V and less than or equal to 20 W/V. Specifically, the discharge power of the first battery pack 161 is greater than or equal to 500 W and less than or equal to 6500 W. Further, the discharge power of the first battery pack 161 is greater than or equal to 500 W and less than or equal to 3000 W, which enables the first battery pack 161 to adapt to the high power needs of the electric riding lawn mower 100 of the present disclosure. In this example, the power supply device 16 includes a plurality of first battery packs 161, and the plurality of first battery packs 161 provide an overall discharge power of greater than or equal to 2000 W and less than or equal to 4000 W, which enables the electric riding lawn mower 100 to output high power, and last a long time, saving the trouble of repeated charging.

In a horizontal direction along the first straight line 101 or along a rotation axis perpendicular to the second axis 103, the distance L4 between the center C of the battery compartment housing 16*a* provided on the rear side of the seat 12 and the second axis 103 of the second walking wheel 142 is less than or equal to 500 mm. Alternatively, the horizontal distance between the center of gravity of the electric riding lawn mower 100 with the first battery pack 161 mounted and the center of the rotating shaft of the second travelling wheel 142 is less than or equal to 500 mm. Alternatively, the horizontal distance between the center of some of the first battery compartments 162 and the center of the rotating shaft of the second walking wheel 142 is less than or equal to 500 mm. Alternatively, the horizontal distance between the center of all of the first battery compartments 162 disposed on the rear side of the seat 12 and the rotating shaft of the second travelling wheel 142 is less than or equal to 500 mm. Further, In a horizontal direction along the first straight line 101 or along a rotation axis perpendicular to the second axis 103, the distance L4 between the center C of the battery compartment housing 16*a* provided on the rear side of the seat 12 and the second axis 103 of the second walking wheel 142 is less than or equal to 300 mm. Alternatively, the horizontal distance between the center of gravity of the electric riding lawn mower 100 with the first battery pack 161 mounted and the center of the rotating shaft of the second travelling wheel 142 is less than or equal to 300 mm. Alternatively, the horizontal distance between the center of some of the first battery compartments 162 and the center of the rotating shaft of the second walking wheel 142 is less than or equal to 300 mm. Alternatively, the horizontal distance between the center of all of the first battery compartments 162 disposed on the rear side of the seat 12 and the rotating shaft of the second travelling wheel 142 is less than or equal to 300 mm. This increases the positive pressure of the second travelling wheel 142 against the ground and the grip of the second travelling wheel 142, and reduces the torque required for the electric riding lawn mower 100 in zero-turns to make zero-turns more flexible. The horizontal distance between one point and another point or line recited in the present disclosure refers to the projection distance between the two on the horizontal plane when the electric riding lawn mower 100 is placed on a horizontal ground. Similarly, the vertical distance between one point and another point or line recited in the present disclosure refers to the projection distance between the two on the vertical plane when the electric riding lawn mower 100 is placed on a horizontal ground.

That is to say, the distance L4 between the center C of entirety constructed by some or all of the first battery compartment 162 provided on the rear side of the seat 12 and the second axis 103 of the second travelling wheel 142 is less than or equal to 300 mm. When all of the first battery compartments 162 in the power supply device 16 are provided with the first battery packs 161, the distance between the center of gravity G3 of the power supply device 16 on the rear side of the seat 12 and the second axis 103 of the second travelling wheel 142 is less than or equal to 300 mm. Therefore, this increases positive pressure of the second travelling wheel 142 on the ground and the friction between the second travelling wheel 142 and the slope surface when the electric riding lawn mower 100 climbs uphill, thereby improving the climbing ability of the riding electric lawn mower 100, and avoiding slippage during walking on the ground or climbing up the hill; in addition, this reduces the torque required for the electric riding lawn mower 100 in zero-turns, allowing more flexible turns to be performed by the electric riding lawn mower 100.

In a direction perpendicular to the first straight line 101 and perpendicular to the second axis 103, the distance between the center C of the battery compartment housing 16*a* disposed on the rear side of the seat 12 and the second axis 103 of the second travelling wheel 142 is less than or equal to 300 mm, that is, in the up-down direction, the distance between the center C of the battery compartment housing 16*a* disposed on the rear side of the seat 12 and the second axis 103 of the second travelling wheel 142 is less than or equal to 300 mm. It can be understood that, in a direction perpendicular to the first straight line 101 and perpendicular to the second axis 103, the distance between the center C of entirety constructed by some or all of the first battery compartment 162 provided on the rear side of the seat 12 and the second axis 103 of the second travelling wheel 142 is less than or equal to 300 mm, that is, in the up-down direction, the distance between the center C of entirety constructed by some or all of the first battery compartment 162 provided on the rear side of the seat 12 and the second axis 103 of the second travelling wheel 142 is less than or equal to 300 mm. In other words, the vertical distance between the center of at least some of the first battery compartments 162 and the center of the rotating shaft of the second travelling wheel 142 is less than or equal to 300 mm. Or the distance between the center of gravity of the electric riding lawn mower 100 with the first battery pack 161 mounted and the center of the rotation axis of the second travelling wheel 142 is less than or equal to 300 mm. In other words, the vertical distance between the center C of all the first battery compartments 162 disposed on the rear side of the seat 12 and the rotating shaft of the second travelling wheel 142 is less than or equal to 300 mm. This helps lowering the center of gravity G1 of the entire electric riding lawn mower 100, thereby reduces the possibility of rollover to the back when the electric riding lawn mower 100 climbs uphill, the possibility of rollover to the front when the electric riding lawn mower 100 goes downhill, and the possibility of rollover to the side when the electric riding lawn mower 100 walks on uneven ground.

Further, the distance between the center of at least some of the first battery compartment 162 and the center of the rotation axis of the second walking wheel 142 in the left-right direction is less than 100 mm; in other words, the distance between the center of gravity of the electric riding lawn mower 100 installed with the first battery pack 161 and the center of the rotation axis of the second walking wheel 142 in the transverse direction of the riding type electric lawn mower 100 is less than 100 mm, so that the center of gravity of the whole machine is closer to the center axis 105 of the whole machine, so that the machine is less likely to tip over when travelling transversely or laterally on the slope.

In a direction parallel to the second axis 103, the distance between the center C of the battery compartment housing 16*a* disposed on the rear side of the seat 12 and the center of the two second travelling wheels 142 is less than or equal to 100 mm; that is, in the left-right direction, the distance between the center C formed by all the numbers of the first battery compartments 162 disposed on the rear side of the seat 12 and the center of the two second travelling wheels 142 is less than or equal to 100 mm. This enables the center of the power supply device 16 to be placed as close as possible to the center axis 105, particularly in the case where the shape of the power supply device 16 is relatively regular, which causes the center of gravity of the power supply device 16 to be placed as close as possible to the center axis 105, to avoid the problem of rollover in the left-right direction when the electric riding lawn mower 100 travels laterally on the slope surface, thereby improving the stability performance of the electric riding lawn mower 100.

As described above, the number of the second travelling wheels 142 is two, and the two second travelling wheels 142 are symmetrically disposed on both sides of a plane of symmetry, and in the present example, the entirety constructed by all of the first battery compartments 162 on the rear side of the seat 12 is symmetrically disposed about the plane of symmetry, thereby improving the balance performance of the whole machine.

Figure 12:
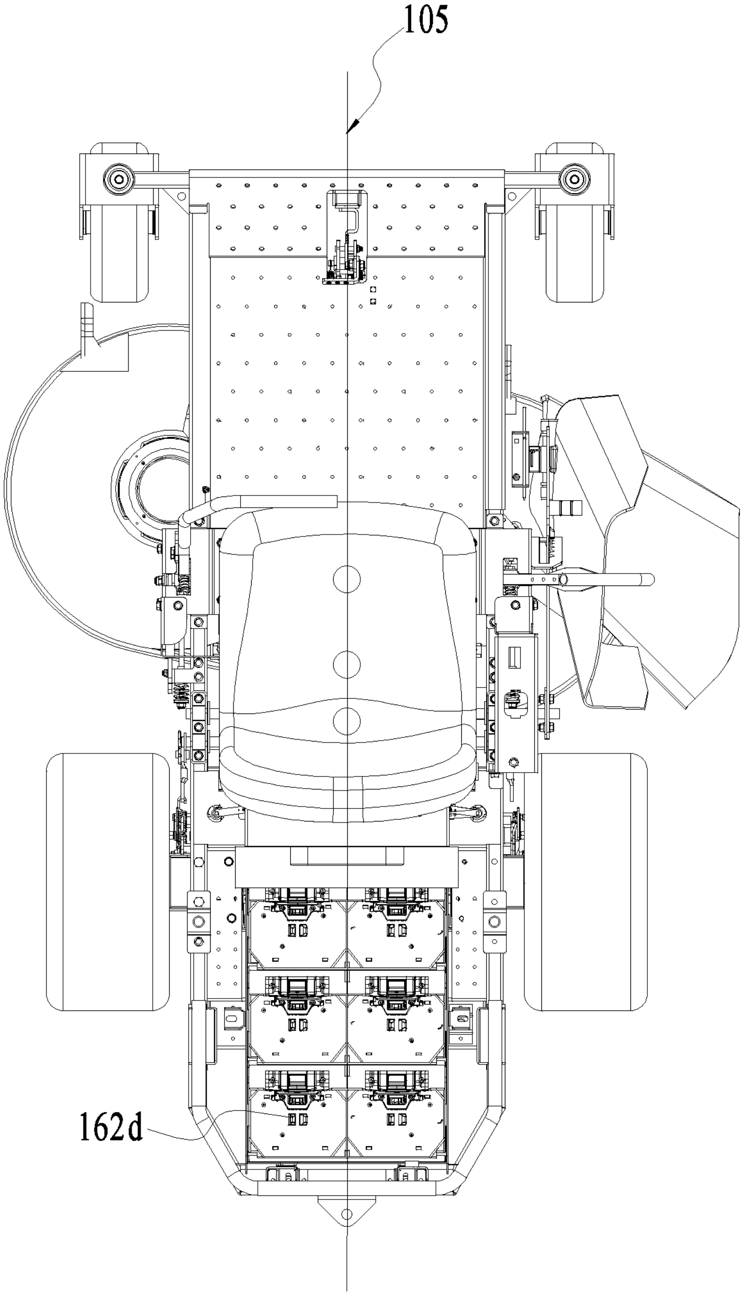
FIG. 12 is a top view of the structure shown in FIG. 11.
Figure 13:
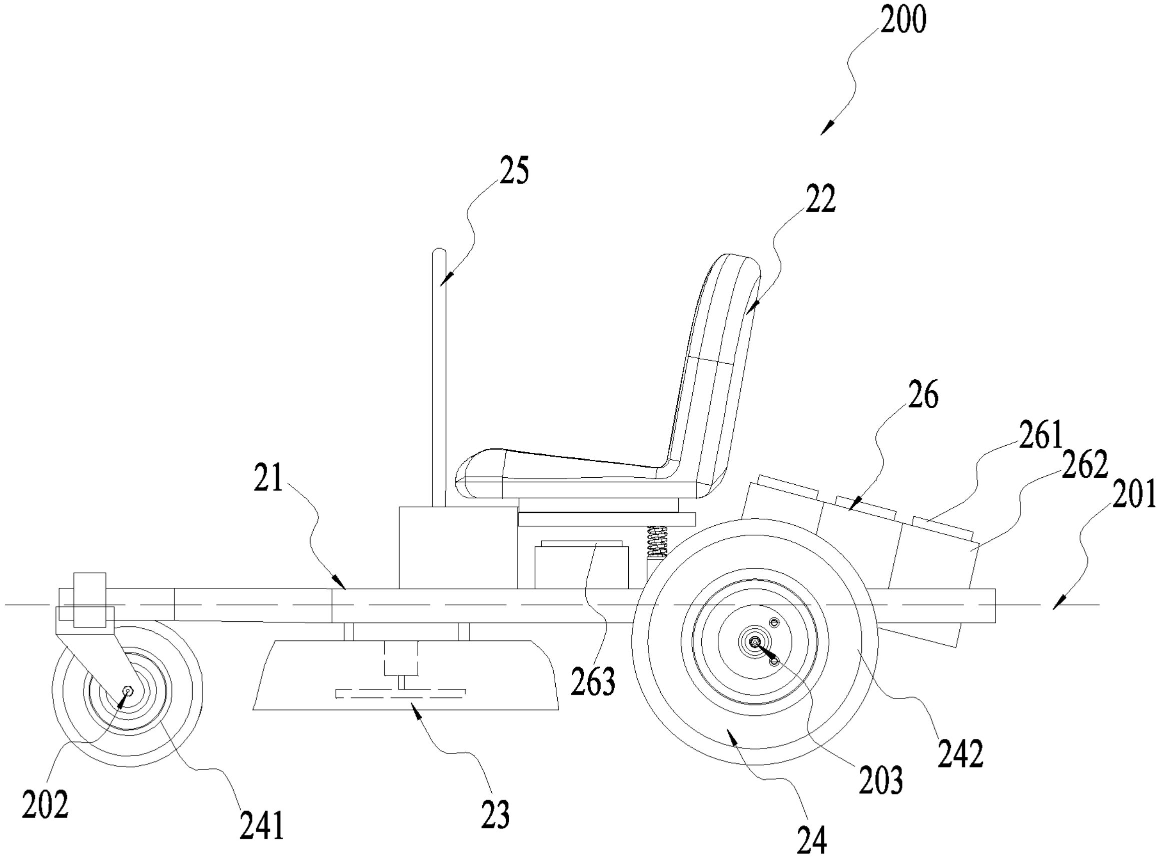
FIG. 13 is a plan view of an electric riding lawn mower of a second example of the present disclosure.

Referring to FIG. 12 or FIG. 13, in the example of the present disclosure, all the battery packs disposed on the rear side of the seat 12 are such that the center of at least some battery packs is located on the right side of the center axis 105 of the electric riding lawn mower 100, and the center of the other battery packs is located on the left side of the center axis 105 of the electric riding lawn mower 100. Here, the center axis 105 of the electric riding lawn mower 100 is parallel to the front-rear direction or the forward direction of the machine. In some other examples of the present disclosure, assuming that the electric riding lawn mower 100 employs at least one large-sized battery pack, a portion of the at least one battery pack disposed on the rear side of the seat 12 is disposed on the right side of the center axis 105 of the electric riding lawn mower 100, and the other portion of the at least one battery pack is disposed on the left side of the center axis 105 of the electric riding lawn mower 100. The battery pack is arranged such that the center of gravity of the electric riding lawn mower 100 is located near the center axis 105 or closer to the center axis 105 of the whole machine, which is advantageous for balancing the center of gravity of the electric riding lawn mower 100.

As shown in FIG. 13, all the battery packs of the electric riding lawn mower 100 are provided, besides on the rear side of the seat 12 as shown in FIG. 12, on the front side of the seat 12. Disposing some battery packs on the front side of the rotating shaft of the second travelling wheel 142, and the other battery packs on the rear side of the rotating shaft of the second travelling wheel 142 increases the positive pressure of the second travelling wheel 142 against the ground and the grip of second travelling wheel 142, and reduces the torque required for the electric riding lawn mower 100 in zero-turns to make zero-turns more flexible. In this example, the battery packs on the front side of the seat 12 may be fixedly mounted to the electric riding lawn mower 100; and the battery packs on the rear side of the seat may be detachably mounted to the electric riding lawn mower 100. In some other examples of the present disclosure, if the battery pack provided in the electric riding lawn mower 100 is a large-sized battery pack, a portion of the large-sized battery pack is located on the front side of the rotating shaft of the second travelling wheel 142, and the other portion of the large-sized battery pack is located on the front side of the rotating shaft of the second travelling wheel 142, so as to increase the positive pressure of the second travelling wheel 142 against the ground and the grip of second travelling wheel 142, and reduce the torque required for the whole machine in zero-turns to make zero-turns more flexible.

In order to prevent the first battery pack 161 from being detached from the first battery compartment 162, a vibration damping device is further disposed between the power supply device 16 and the main frame 11, so that the first battery pack 161 can be prevented from being detached from the first battery compartment 162, thereby improving the effective electrical connection between the first battery pack 161 and the first battery compartment 162.

When the first battery pack 161 is inserted into the first groove 162*a*, the dimension of the cross section of the first battery pack 161 in a plane perpendicular to the direction of the second straight line 104 along the direction in the first straight line 101 is smaller than the dimension of the cross section along the direction perpendicular to the first straight line 101 and parallel to the plane, that is, when the first battery pack 161 is inserted into the first groove 162*a*, the first battery pack 161 has a thinner dimension in the direction perpendicular the first straight line 101 than in the direction of the first straight line 101, thereby facilitating the user to grasp the first battery pack 161 to insert the first battery pack 161 into the first groove 162*a* or pull it out from the first groove in 162*a*.

The first battery pack 161 may specifically include a first battery pack housing 161*b* and a plurality of battery cells 161*a* disposed in the first battery pack housing 161*b*. The direction in which the battery cells 161*a* extends in the first battery pack 161 is parallel to the direction of the second line 104 in which the first battery pack 161 is inserted into the first groove 162*a*.

As shown in FIG. 1, the electric riding lawn mower 100 may further be provided with a grass collecting device 17 for collecting grass, and the grass collecting device 17 may be detachably connected to the main body portion of the electric riding lawn mower 100. The grass collecting device 17 specifically includes a grass collecting basket 171 and a connecting pipe 172; the grass collecting basket 171 is for accommodating the cut grass clippings, and the connecting pipe 172 is connected to the bottom plate 133 and the grass collecting basket 171 to deliver the grass clippings to the grass collecting basket 171. In the present example, the power supply device 16 is disposed on the rear side of the seat, and the power supply device 16 further includes a battery compartment housing 16*a*. The plurality of first battery packs 161 of the power supply device 16 are arranged substantially in a plane perpendicular to the up-down direction. This allows the shape of the battery compartment housing 16*a* to be substantially disposed in the plane such that the upper side of the cover 16*c* of the battery compartment housing 16*a* and the rear side of the seat 12 have a large free space, which allows the grass basket 171 to be placed on the upper side of the battery compartment housing 16*a*, thereby saving space, and making the structure of the whole machine more reasonable and more compact. Furthermore, due to its light weight, placing the grass basket 171 on the rear end of the electric riding lawn mower 100 does not have a great impact on the center of gravity of the whole machine. Therefore, it can be understood that the center of gravity of the electric riding lawn mower 100 or the center of gravity of the entirety of the electric riding lawn mower 100 and the user can be understood as either including the grass collecting device 17 or not including the grass collecting device 17.

The electric riding lawn mower 200 of the second example shown in FIG. 13 may have the same main frame 21, seat 22, power output assembly 23, walking assembly 24 and operating assembly 25 as the electric riding lawn mower in the first example. This example only differs from the first example in that the power supply device 26 includes a second battery pack 263 besides the first battery compartment 262 and the first battery pack 261 as in the first example. The parts of the first example that are compatible with this example can be applied to this example, and details are not described herein.

In the present example, the second battery pack 263 can be disposed on the lower side of the seat 22, so that the center of gravity G of the whole machine in the direction along the first straight line 201 can be as close as possible to the seat 22 and the first travelling wheel 241 in order to effectively avoid the problem of tilting up when the electric riding lawn mower 200 climbs uphill; and this also increases the positive pressure of the first travelling wheel 241 against the ground and the grip of the first travelling wheel 241 to prevent the electric riding lawn mower 200 from slippage when walking on the ground; further, especially when the rear end of the electric riding lawn mower 200 is provided with the grass collecting device, the structure of the second battery pack 263 being disposed on the lower side of the seat 22 can effectively reduce the center of gravity G of the electric riding lawn mower 200, thereby improving the stability of the whole machine. Further, the second battery pack 263 is also disposed on the front side of the second travelling wheel 242.

In addition, in the example, the second battery pack 263 may be fixedly mounted to the main frame 21, that is, the second battery pack 263 is not quickly removable by the user without using auxiliary tools, so that the second battery pack 263 can be fixed on the main frame 21 to continuously supply power to the electric riding lawn mower 200, thereby avoiding the situation when both the first battery pack 261 and the second battery pack 263 in the power supply device 26 are removed by the user such that the walking assembly 14 does not have power supply and that the electric riding lawn mower 200 cannot walk. Of course, it can be understood that the second battery pack 263 can also be configured to be detachable or pluggable by the user.

The position of the second battery pack 263 is not limited to being disposed on the lower side of the seat 22, in fact, as long as it is distinguished from the position of the first battery pack 261 because of considerations in balance performance or structural adaptation of the whole machine, it is within the scope of this disclosure.

In the present example, only one second battery pack 263 is provided on the lower side of the seat 22. Of course, it can be understood that the second battery pack 263 on the lower side of the seat 22 may also be two or more. In the direction perpendicular to the first line 201 and the first axis 202, the distance between the center of gravity of the entirety formed by all the battery packs in the power supply device 16 and the second axis 203 is less than 300 mm, that is, the distance between the center of gravity of the entirety formed by all the first battery packs 261 plus all the second battery packs 263 and the second axis 203 is less than 300 mm, such that the center of gravity of the entire electric riding lawn mower 200 can be lowered, thereby avoiding the problem of rollover on the slope.

In addition, in other examples, it is also possible to configure one or more of the first battery packs 261 disposed on the rear side of the seat 22 to be fixedly mounted to the main frame 21, which also prevents the electric riding lawn mower 200 from the problem of being unable to walk due to the lack of power source.

Figure 14:
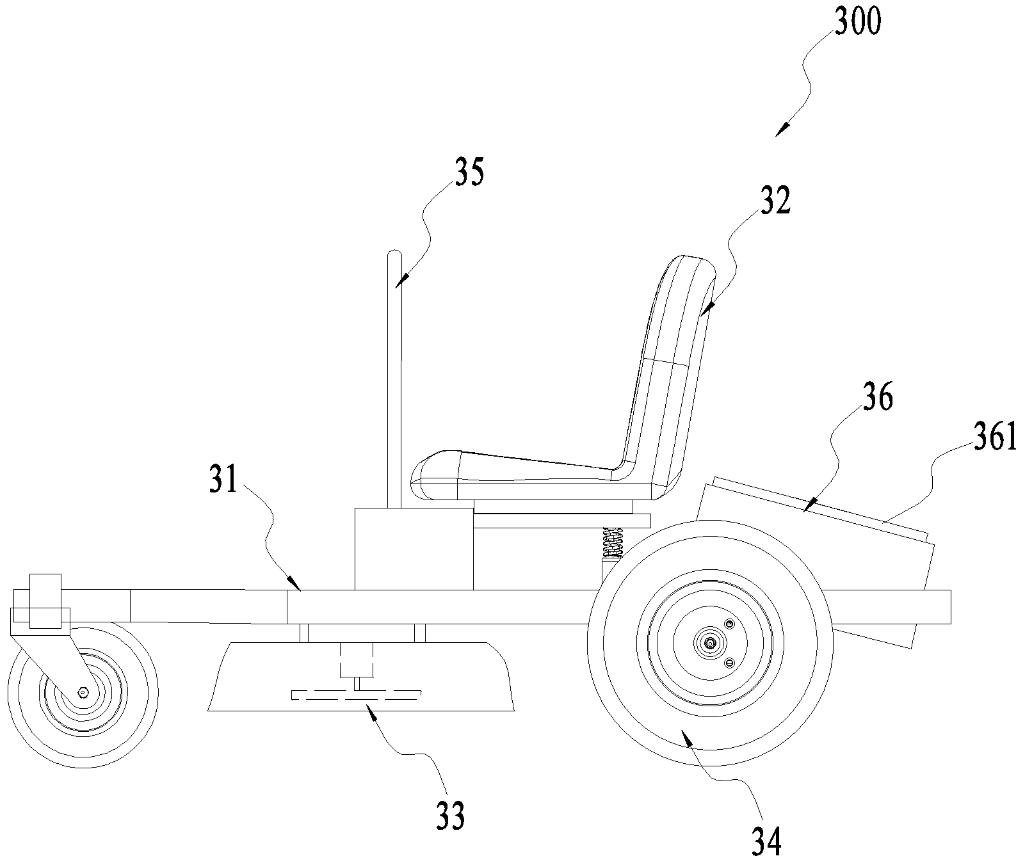
FIG. 14 is a plan view of an electric riding lawn mower of a third example of the present disclosure.
Figure 15:
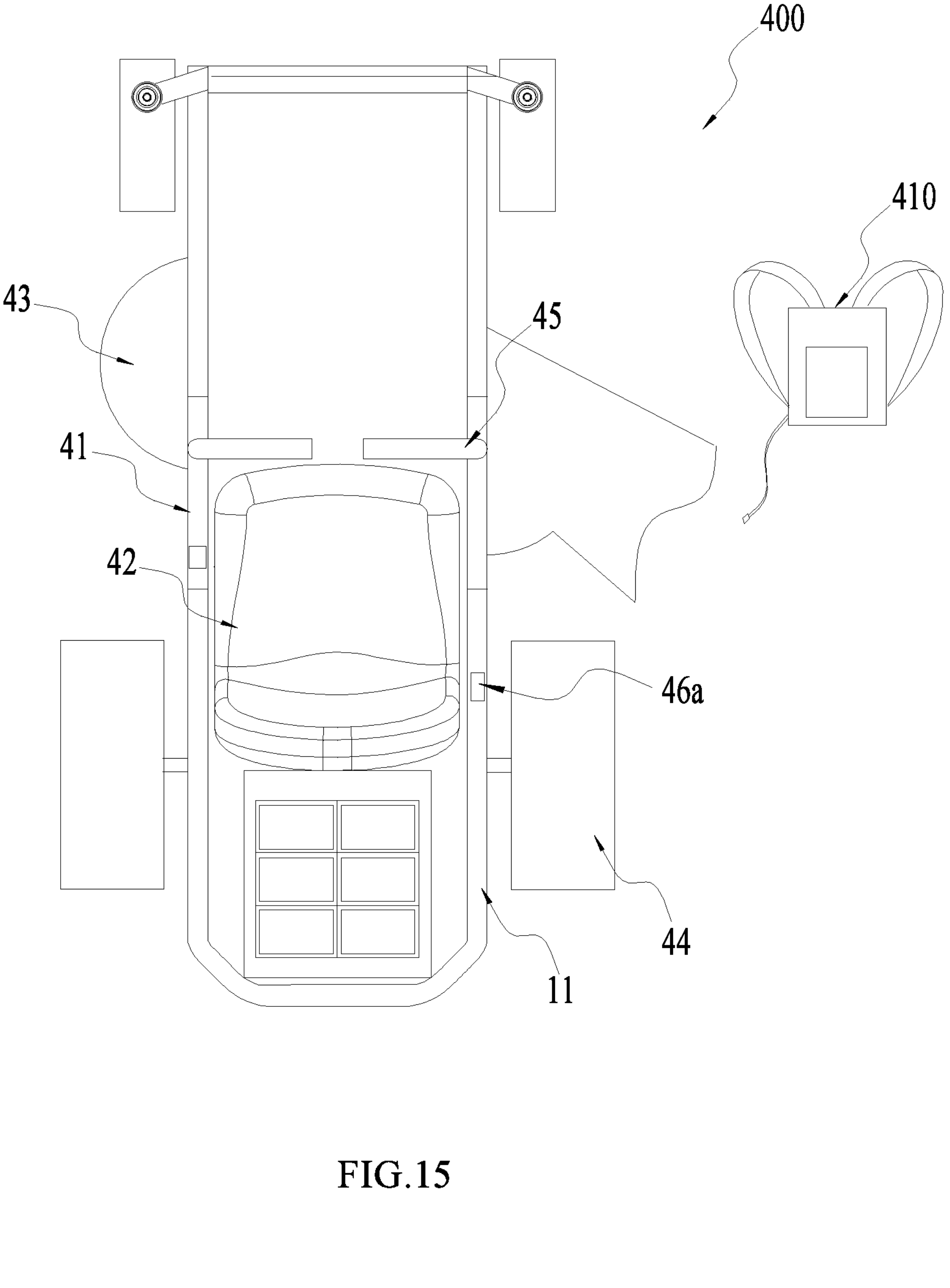
FIG. 15 is a top view of an electric riding lawn mower of a fourth example of the present disclosure.

In the third example shown in FIG. 14, the electric riding lawn mower 300 may have the same main frame 31, seat 32, power output assembly 33, walking assembly 34 and operating assembly 35 as the electric riding lawn mower 100 of the first example. This example only differs from the first example in that the power supply device 36 includes only a first battery pack 361 having a larger capacity, and the first battery pack 361 can be detachably coupled to electric riding lawn mower 300 with a pluggable approach performed by the user. In the fourth example shown in FIG. 15, the electric riding lawn mower 400 may have the same main frame 41, seat 42, power output assembly 43, walking assembly 44 and operating assembly 45 as the electric riding lawn mower 100 of the first example. This example only differs from the first example in that the power supply device 46 includes a power supply interface **46*a* for connecting a backpack power supply device 410 such that when the user sits in the seat 42, the user can carry the backpack power supply device 410 on the back to facilitate the operation of the electric riding lawn mower 400**.

Figure 16:
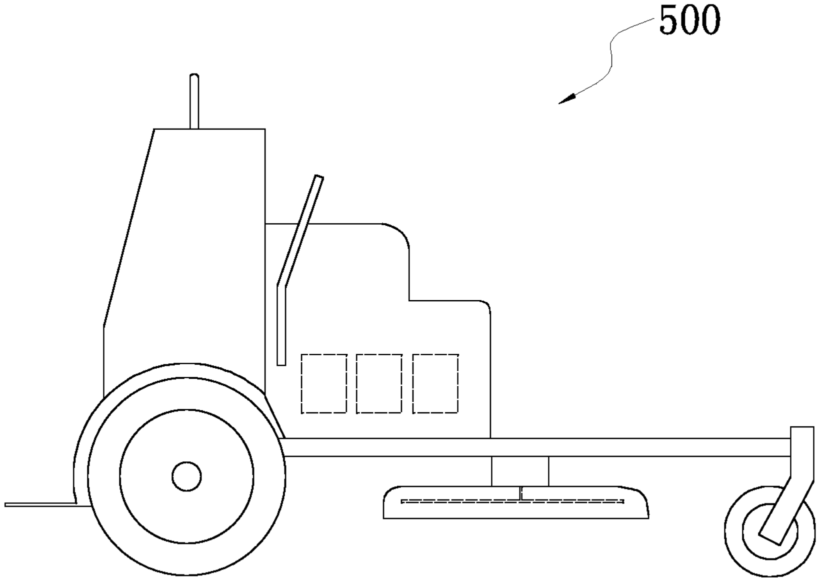
FIG. 16 is a perspective view of a stand-on lawn mower as an example of an electric riding lawn mower.

Referring to FIG. 16, the electric riding lawn mower may be a stand-on lawn mower. All the technical solutions of the electric riding lawn mower 100 in FIGS. 1 to 15 that can be adapted to the stand-on lawn mower can be applied to the stand-on lawn mower.

The basic principles, main features and advantages of the present disclosure have been shown and described above. It should be understood by those skilled in the art that the above-described examples are not intended to limit the disclosure in any way, and the technical solutions obtained by means of equivalent replacement or equivalent transformation are all within the scope of the disclosure. It will also be understood that the present disclosure provides an electric riding lawn mower with better adaptability and less usage cost.

What is claimed is:

1. An electric stand-on lawn mower, comprising:

a supporting portion for carrying a user;

a body;

a power output assembly comprising a mowing element for mowing grass;

a walking assembly configured to at least drive the electric stand-on lawn mower to travel on the ground;

an electric motor assembly configured to drive at least one of the power output assembly and the walking assembly; and a power supply device comprising at least four battery packs to power the electric motor assembly;

wherein each of the at least four battery packs are configured to be detachably mounted to the body, each of the at least four battery packs are further configured to power hand-held power tools when each of the at least four battery packs are removed from the body, and a capacity of each of the at least four battery packs is greater than or equal to 130 Wh and less than or equal to 1000 Wh.

2. The electric stand-on lawn mower of claim 1, wherein the electric motor assembly comprises a first electric motor for driving the mowing element and a second electric motor for driving the walking assembly, and the at least four battery packs are configured to power the first electric motor and the second electric motor.

3. The electric stand-on lawn mower of claim 2, wherein the walking assembly comprises front wheels and rear wheels, the front wheels are universal wheels, and the second electric motor is configured to drive the rear wheels.

4. The electric stand-on lawn mower of claim 2, wherein a power of the first electric motor is greater than or equal to 500 W.

5. The electric stand-on lawn mower of claim 1, wherein the hand-held power tools are string trimmers.

6. The electric stand-on lawn mower of claim 1, wherein the hand-held power tools are garden tools.

7. The electric stand-on lawn mower of claim 1, wherein the at least four battery packs are further configured to power hand-push power tools when the at least four battery packs are removed from the body.

8. The electric stand-on lawn mower of claim 7, wherein the hand-push power tools are hand-push lawn mowers.

9. An electric stand-on lawn mower, comprising:

a supporting portion for supporting a user;

a main frame;

a walking assembly configured to at least drive the electric stand-on lawn mower to travel on the ground;

a motor assembly configured to drive the walking assembly; and a plurality of battery compartments configured to detachably mount and accommodate a plurality of battery packs capable of powering garden tools, wherein each of the plurality of battery packs is capable of respectively being mounted to each of the plurality of battery compartments;

wherein each of the plurality of battery compartments is further provided with input terminals to bring in electrical energy to the motor assembly from each of the plurality of battery packs.

10. The electric stand-on lawn mower of claim 9, further comprising a battery compartment housing comprising a main body portion and a cover, wherein the main body portion is provided with the plurality of battery compartments.

11. The electric stand-on lawn mower of claim 9, further comprising a battery compartment housing comprising a main body portion and a cover, wherein the main body portion is provided with the plurality of battery compartments, the cover is pivotally coupled to the main body portion, the cover has an open state and a closed state, and the plurality of battery compartments are opened and the user can insert the plurality of battery packs into the plurality of battery compartments when the cover is in the open state.

12. The electric stand-on lawn mower of claim 9, wherein the plurality of battery compartments are provided with latches for locking the plurality of battery packs.

13. The electric stand-on lawn mower of claim 9, wherein the plurality of battery compartments are provided with pop-up structures for ejecting the plurality of battery packs.

14. The electric stand-on lawn mower of claim 9, wherein each of the plurality of battery compartments is provided with a guiding structure for guiding each of the plurality of battery packs to be inserted into each of the plurality of battery compartments in a straight line.

15. An electric stand-on lawn mower, comprising:

a supporting portion for carrying a user;

a body;

a power output assembly comprising a mowing element for outputting power to realize a mowing;

a walking assembly configured to at least drive the electric stand-on lawn mower to travel on the ground;

an electric motor assembly configured to drive at least one of the power output assembly and the walking assembly; and a power supply device comprising a plurality of battery packs to power the electric motor assembly;

wherein the plurality of battery packs are configured to be detachably mounted to the body, the plurality of battery packs are further configured to power hand-held power tools when the plurality of battery packs are removed from the body, and the plurality of battery packs provide an overall discharge power of greater than or equal to 2000 W.

16. The electric stand-on lawn mower of claim 15, wherein a ratio of a discharge power of a single one of the plurality of battery packs to a nominal voltage of the plurality of battery packs is greater than or equal to 10 W/V and less than or equal to 25 W/V.

17. The electric stand-on lawn mower of claim 15, wherein a discharge power of a single one of the plurality of battery packs is greater than or equal to 500 W.

18. An electric riding lawn mower, comprising:

a supporting portion for carrying a user;

a body;

a power output assembly comprising a mowing element for outputting power to realize a mowing;

a walking assembly configured to at least drive the electric riding lawn mower to travel on the ground;

an electric motor assembly configured to drive at least one of the power output assembly and the walking assembly;

a power supply device comprising a plurality of first battery packs disposed at a first position and a plurality of second battery packs disposed at a second position different from the first position;

wherein the plurality of first battery packs are configured to power the electric motor assembly and be detachably mounted to the body, and the plurality of first battery packs are further configured to power hand-push power tools when the plurality of first battery packs are removed from the body.

19. The electric riding lawn mower of claim 18, wherein the body is provided with a plurality of battery compartments configured to respectively mount and accommodate the plurality of first battery packs.

20. The electric riding lawn mower of claim 19, wherein the plurality of battery compartments are provided with pop-up structures for ejecting the plurality of first battery packs.

* * * * *